US011083047B2

(12) United States Patent
Sadri et al.

(10) Patent No.: US 11,083,047 B2
(45) Date of Patent: Aug. 3, 2021

(54) 5G MMWAVE WIRELESS REMOTE RADIO HEAD SYSTEM

(71) Applicant: Apple Inc., Cupertino, CA (US)

(72) Inventors: Ali S. Sadri, San Diego, CA (US); Liang Xian, Portland, OR (US); Arnaud Lucres Amadjikpe, Beaverton, OR (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/461,727

(22) PCT Filed: Nov. 17, 2017

(86) PCT No.: PCT/US2017/062288
§ 371 (c)(1),
(2) Date: May 16, 2019

(87) PCT Pub. No.: WO2018/094203
PCT Pub. Date: May 24, 2018

(65) Prior Publication Data
US 2019/0320498 A1 Oct. 17, 2019

Related U.S. Application Data

(60) Provisional application No. 62/424,108, filed on Nov. 18, 2016.

(51) Int. Cl.
*H04W 88/08* (2009.01)
*H04W 88/16* (2009.01)
*H04W 84/04* (2009.01)

(52) U.S. Cl.
CPC ......... *H04W 88/16* (2013.01); *H04W 88/085* (2013.01); *H04W 84/045* (2013.01)

(58) Field of Classification Search
CPC ............... H04W 84/045; H04W 88/16; H04W 72/0453; H04W 88/08; H04B 7/15507
See application file for complete search history.

(56) References Cited

U.S. PATENT DOCUMENTS

2002/0060646 A1  5/2002  Petros
2003/0104781 A1  6/2003  Son
(Continued)

FOREIGN PATENT DOCUMENTS

EP    1622287         2/2006
KR    1020140130660 A  11/2014
WO    WO-2018094203 A1 5/2018

OTHER PUBLICATIONS

"International Application Serial No. PCT/US2017/062288, International Search Report dated Mar. 29, 2018", 3 pgs.
(Continued)

*Primary Examiner* — Dominic E Rego
(74) *Attorney, Agent, or Firm* — Kowert Hood Munyon Rankin and Goetzel PC

(57) ABSTRACT

A remote radio head as part of a small cell or home gateway communication system, comprising a baseband module and a radio unit, the baseband module and the radio unit being configured to be placed on opposing sides of a lossy medium, such as a window. The baseband module is configured to receive and transmit an information signal from a user equipment inside of a structure and the radio unit configured to receive and transmit an information signal from a user equipment or a base station node outside of the structure. The baseband module is further configured to perform signal modulation and demodulation and up-conversion and down-conversion, and the radio unit is configured to perform up-conversion and down-conversion. The baseband module and the radio unit are capable of receiving and transmitting wireless intermediate frequency signals
(Continued)

through a lossy medium, so as to avoid signal attenuation, particularly for mmWave wireless signals.

20 Claims, 6 Drawing Sheets

(56) References Cited

U.S. PATENT DOCUMENTS

| | | |
|---|---|---|
| 2008/0036588 A1 | 2/2008 | Iverson et al. |
| 2009/0289844 A1 | 11/2009 | Palsgrove et al. |
| 2011/0019999 A1 | 1/2011 | George |
| 2014/0368385 A1* | 12/2014 | Haluba ............... H01Q 25/002 |
| | | 342/374 |
| 2015/0147066 A1 | 5/2015 | Benjamin et al. |
| 2015/0256377 A1* | 9/2015 | Dhananjay .......... H04L 25/0232 |
| | | 375/340 |
| 2016/0087744 A1 | 3/2016 | El Ayach |
| 2016/0149635 A1* | 5/2016 | Hinman ................ H04B 7/026 |
| | | 370/315 |
| 2016/0248451 A1 | 8/2016 | Weissman et al. |
| 2016/0323015 A1* | 11/2016 | Henry .................... H04B 3/542 |
| 2018/0019798 A1* | 1/2018 | Khan ................... H04B 5/0037 |

OTHER PUBLICATIONS

"International Application Serial No. PCT/US2017/062288, Written Opinion dated Mar. 29, 2018", 10 pgs.
Extended European Search Report in application No. 17872580.0-1212/3542467—PCT/US2017062288 dated May 13, 2020, 8 pages.

* cited by examiner

5G MMWAVE WIRELESS REMOTE RADIO HEAD SYSTEM

PRIORITY CLAIM

This application is a U.S. National Stage Filing under 35 U.S.C. 371 from International Application No. PCT/US2017/062288, filed on Nov. 17, 2017, and published as WO 2018/094203 on May 24, 2018, which claims priority to U.S. Provisional Patent Application Ser. No. 62/424,108 filed Nov. 18, 2016, both of which are incorporated herein by reference in their entirety.

TECHNICAL FIELD

Aspects pertain to radio access networks. Some aspects relate to millimeter-wave (mmWave) band communications in cellular networks. Specifically, certain aspects relate to mmWave radio communication architectures within home gateway systems.

BACKGROUND

Millimeter wave (mmWave) frequencies, frequencies between 30 GHz and 300 GHz in the electromagnetic spectrum, are considered some of the most promising candidate frequency bands of 5th Generation (5G) mobile networks. As demand for data usage increases, the need to adapt wireless network capacity becomes more necessary. Some methods of increasing wireless network capacity have involved using frequencies below 6 gigahertz (GHz), developing increasingly complex modulation techniques and incrementally increasing channel bandwidth.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various aspects discussed in the present document.

DETAILED DESCRIPTION OF THE DRAWINGS

The following description and the drawings sufficiently illustrate specific aspects to enable those skilled in the art to practice them. Other aspects may incorporate structural, logical, electrical, process, and other changes. Portions and features of some aspects may be included in, or substituted for, those of other aspects. Aspects set forth in the claims encompass all available equivalents of those claims.

While some methods of increasing wireless network capacity have previously been somewhat effective, these methods may not continue to serve the needs of wireless network users, especially with ongoing exponential demand for data. In addition to wireless networks utilizing macro cells in providing service to users, next-generation wireless networks may also utilize small cells to increase network capacity. Furthermore, next-generation wireless networks may utilize upper frequency bands (e.g., cmWave and mmWave bands) for higher throughput communications. In the case of utilizing frequencies above 28 GHz, nearby towers or lamp posts, for example, may provide fixed access to residences and businesses. While communications within upper frequency bands have benefits, including higher throughput, bandwidth availability, inherent noise-limited communications and ability to utilize beamforming technology, certain limitations also exist. One limitation of such communications includes signal path loss.

For example, mmWave communications involve higher path loss during transmission in comparison to microwave communications within frequency bands below 6 GHz. Furthermore, signals transmitted from devices utilizing mmWave communications exhibit greater attenuation through material such as glazed and tinted glass windows, in comparison to communications within frequencies below 6 GHz. Furthermore, absorption loss and penetration loss increase as a function of glass thickness, glaze and tinting material. Consequently, the placement of home gateway devices inside buildings near windows may not be effective for mmWave communications. Depending on the type of window material, the angle of the incidence and the utilized frequency band, mmWave signals may exhibit an additional 20-40 decibels (dB) of attenuation. Consequently, it is recommended to place the home gateway devices outside of the home and connect power and network cables from inside the home to the device. These constraints could significantly affect vast utilization of the mmWave frequency bands for 5G mobile networks.

Figure 1:
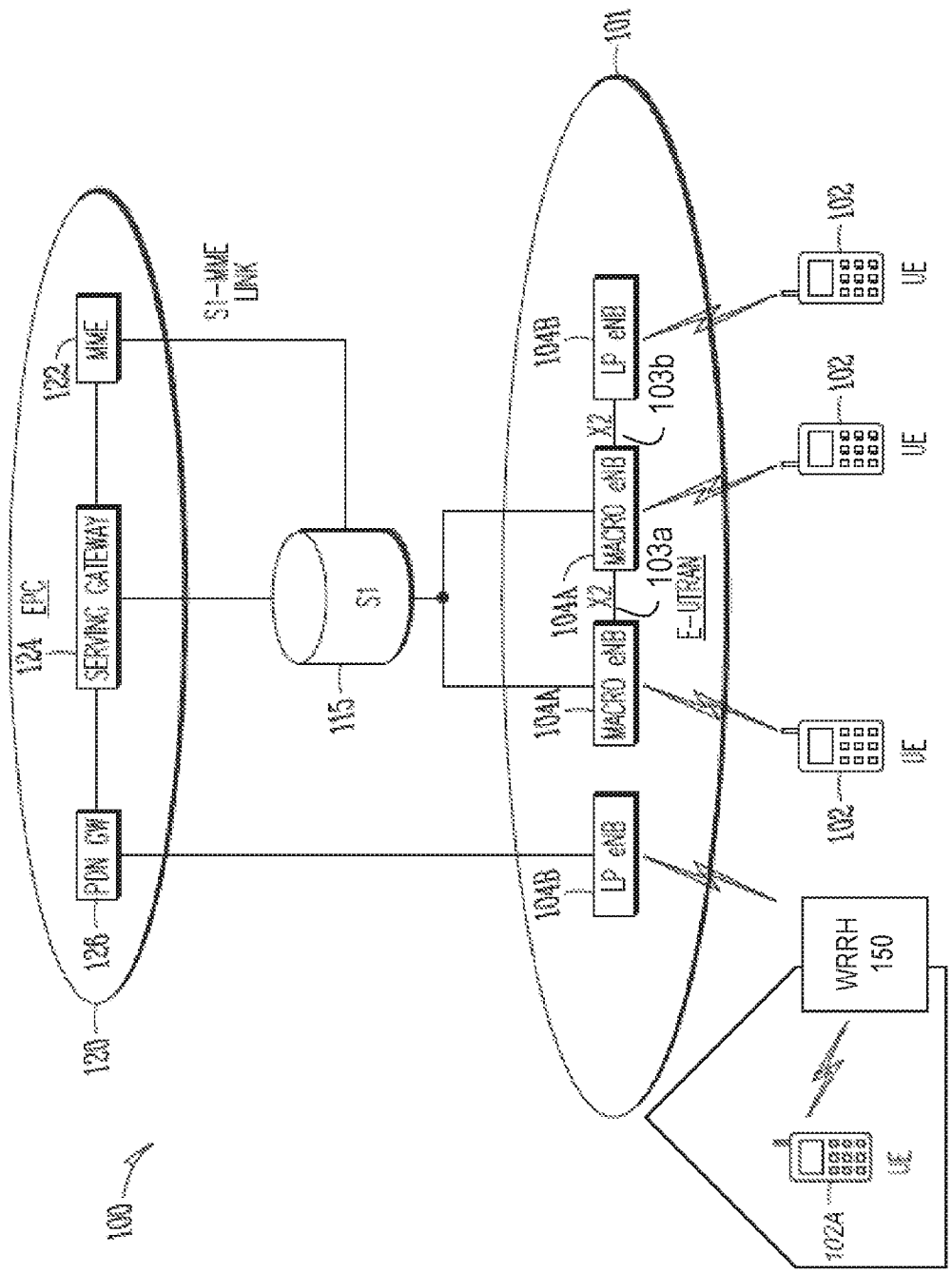
FIG. 1 shows an exemplary portion of an end-to-end network architecture of a LTE network in accordance with some aspects.

FIG. 1 shows an exemplary portion of an end-to-end network architecture of an exemplary wireless communications network, in accordance with some aspects. In some aspects, the wireless communications network includes a cellular network. For example, the wireless communications network includes a Long Term Evolution (LTE) network. As used herein, an LTE network can refer to both LTE network and LTE Advanced (LTE-A) network as well as other versions of LTE networks to be developed. The network 100 includes a radio access network (RAN) (e.g., as depicted, the E-UTRAN or evolved universal terrestrial radio access network) 101 and a core network 120 (e.g., shown as an evolved packet core (EPC)) coupled together through an S1 interface 115. For convenience and brevity, only a portion of the core network 120, as well as the RAN 101, is shown in the example.

In some aspects, the core network 120 includes a mobility management entity (MME) 122, a serving gateway (serving GW) 124, and/or a packet data network gateway (PDN GW) 126. The RAN 101 may include one or more base stations 104. The one or more base stations can include evolved node Bs (eNodeBs or eNBs) for communicating with one or more mobile devices 102, such as user equipment (UE). The eNBs 104 may include macro eNBs 104a and low power (LP) eNBs 104b. The LP eNB 104b includes any suitable, relatively low-power, eNB for implementing a small cell (e.g., smaller than a macro cell). In some aspects, the LP eNB 104b can include a femtocell, a picocell, and/or a microcell.

Other elements, such as a Home Location Register (HLR)/Home Subscriber Server (HSS)—a database including subscriber information of a 3GPP network that may perform configuration storage, identity management and user state storage, and a Policy and Charging Rule Function (PCRF) performing policy decision for dynamically applying Quality of Service (QoS) and charging policy per service flow—are not shown for convenience.

The MME 122 may be similar in function to the control plane of legacy Serving General Packet Radio Service Support Nodes (Serving GPRS Support Nodes, or SGSNs). The MME 122 may manage mobility aspects in access such as gateway selection and tracking area list management, performing both mobility management (MM) and session management (SM). The Non-Access Stratum (NAS) is a control plane between a UE 102 and the MME 122. The NAS is used for signaling between the UE 102 and the EPC and for exchanging a traffic message between the UE 102 and the EPC in LTE/UMTS protocol stack. The NAS supports UE mobility and session management for establishing and maintaining an IP connection between the UE 102 and PDN GW 126.

The serving GW 124 may terminate the interface toward the RAN 101, and route data packets between the RAN 101 and the core network 120. In addition, the serving GW 124 may be a local mobility anchor point for inter-eNB handovers and may also provide an anchor for inter-3GPP mobility. Other responsibilities may include lawful intercept, charging, and policy enforcement, packet routing, idle mode packet buffering, and triggering an MME to page a UE. The serving GW 124 and the MME 122 may be implemented in one physical node or separate physical nodes.

The PDN GW 126 may terminate a SGi interface toward the packet data network (PDN). The PDN GW 126 may route data packets between the core network 120 and the external PDN, and may perform policy enforcement and charging data collection, UE IP address assignment, packet screening and filtering. The PDN GW 126 may also provide an anchor point for mobility devices with a non-LTE access. The external PDN can be any kind of IP network, as well as an IP Multimedia. Subsystem (IMS) domain. The PDN GW 126 and the serving GW 124 may be implemented in a single physical node or separate physical nodes.

The eNBs 104 (e.g., macro eNBs and/or LP eNBs) may terminate the air interface protocol and may be the first point of contact for UE 102. In some aspects, an eNB 104 may fulfill various logical functions for the RAN 101. For example, an eNB 104 can perform in radio network controller (RNC) functions such as radio bearer management, uplink and downlink dynamic radio resource management and data packet scheduling, and mobility management.

In accordance with aspects, UEs 102 may be configured to communicate orthogonal frequency division multiplexed (OFDM) communication signals with an eNB 104 over a multicarrier communication channel in accordance with an OFDMA communication technique. The OFDM signals may include a plurality of orthogonal subcarriers.

The S1 interface 115 may be an interface that provides communication between the RAN 101 and the core network 120. In some aspects, the S1 interface may include two parts: the S1-U, which may carry traffic data between the eNBs 104 and the serving GW 124, and the S1-MME, which may be a signaling interface between the eNBs 104 and the MME 122.

The X2 interface 103 may be the interface between eNBs 104. The X2 interface may include two parts, the X2-C and X2-U. The X2-C may be the control plane interface between the eNBs 104, while the X2-U may be the user plane interface between the eNBs 104.

In some aspects, LP eNBs 104b may be configured to improve the coverage of communications network. For example, LP eNBs 104b can be configured to extend the coverage of communications network to indoor areas where outdoor signals do not reach well. As another example, LP eNBs 104b can add network capacity in areas with dense usage.

In some cases, it may be desirable to enhance the coverage of a wireless communication system using cells of different sizes. For example, the coverage of wireless communication system can be extended using macrocells, microcells, picocells, and femtocells. The cells of different sizes may operate on the same frequency band, or may operate on different frequency bands with each cell operating in a different frequency band or only cells of different sizes operating on different frequency hands.

In some aspects, femtocell eNBs may be provided by a mobile network operator to its residential or enterprise customers. A femtocell may be the size of a residential gateway or smaller and generally connect to a broadband line. In some cases, a femtocell may connect to the mobile operator's mobile network and provide extra coverage in a range of about 30 to 50 meters. Thus, a femtocell eNB can operate as a LP eNB 104b that is coupled to the core network 120 through the PDN GW 126.

Similarly, a picocell may be a wireless communication system typically covering a small area, such as in-building (offices, shopping malls, train stations, etc.), or in-aircraft. A picocell eNB may generally connect through the X2 link to another eNB, such as a macro eNB 104a, through its base station controller (BSC) functionality. Thus, the picocell eNB can serve as a LP eNB 104b that is coupled to a macro eNB 104a via an X2 interface. Picocell eNBs or other LP eNB 104b may incorporate some or all functionality of a macro eNB 104a. In some cases, this may be referred to as an access point base station or enterprise femtocell.

In general, the UE 102 may communicate with various types of systems, including a UTRAN and GERAN cell, which may provide voice services only, and an E-UTRAN cell, which may provide packet services only. The UTRAN and GERAN cells may be coupled with a Serving General Packet Radio Subsystem Support Node (SGSN) and mobile switching center (MSC) server. The E-UTRAN may be coupled with the MME 122, which in turn may be coupled with the SGSN and the MSC server.

In some cases, the GERAN and UTRAN RANs may be connected to a circuit-switched (CS) domain of the network 100. For circumstances in which UE 102 is communicating via the E-UTRAN cell when setup a CS voice call is desired, the mobile network may include a CS fallback (CSFB). In CSFB, the UE 102 in the E-UTRAN cell may engage in a CS call—either by setting up a call or responding to a paging message for a CS call. The network 100 may then redirect the UE 102 to a GERAN or UTRAN cell, such as via a packet-switched (PS) handover, via a "release with redirection" procedure, or via a network-assisted cell change over (CCO). In such examples, the UE 102 can set up the mobile originating call or receive the mobile terminating call via the MSC server. Once the CS call is released in GERAN and/or UTRAN cells, the UE 102 may return to the E-UTRAN cell either on its own (e.g., via cell re-selection) or with the help of the GERAN and/or UTRAN (e.g., if, during the release of the radio connection for the CS call the GERAN and/or UTRAN cells commands the UE 102 to immediately select a specific E-UTRAN cell).

In operation, for example during the CS call, if the UE 102 is in a GERAN cell and does not support the simultaneous use of CS services and packet services, the network 100 may suspend packet services for the UE 102. Downlink packets may not be delivered to the UE 102 but may be forwarded the PDN GW 126 toward the UE 102. In an example, the UE 102 and/or one of the core network nodes (e.g., the MME and/or the SGSN, as appropriate) may inform the serving GW 124 and/or the PDN GW 126 that the gateways should no longer forward downlink user packets to the UE 102. The MME 122 or SGSN may also deactivate dedicated packet bearers which are used for real-time services. The CS call may be released, or, during the CS call, the UE 102 may be handed over to a cell where CS services and packet services can be used simultaneously. Packet services may then be resumed.

In some aspects, network 100 may also include a Wireless Remote Radio Head (WRRH) 150. In some aspects, the WRRH 150 comprises an baseband module and a radio unit that are separated by and communicate bi-directionally and wirelessly through a lossy medium, for example, a window. The baseband module may receive and transmit signals to and from a UE (e.g., UE 102A) and the radio unit may receive and transmit signals to and from a network node (e.g., an eNB 104 or base station). In some aspects, the baseband module may receive and transmit signals to and from a UE inside of a structure and the radio unit may receive and transmit signals to and from a network node outside of the structure. A structure may be a fully enclosed structure such as a home or office building, any partially enclosed area, or a non-enclosed environment that may be obstructed by a lossy medium that attenuates a signal. These aspects are described in more detail below.

Figure 2:
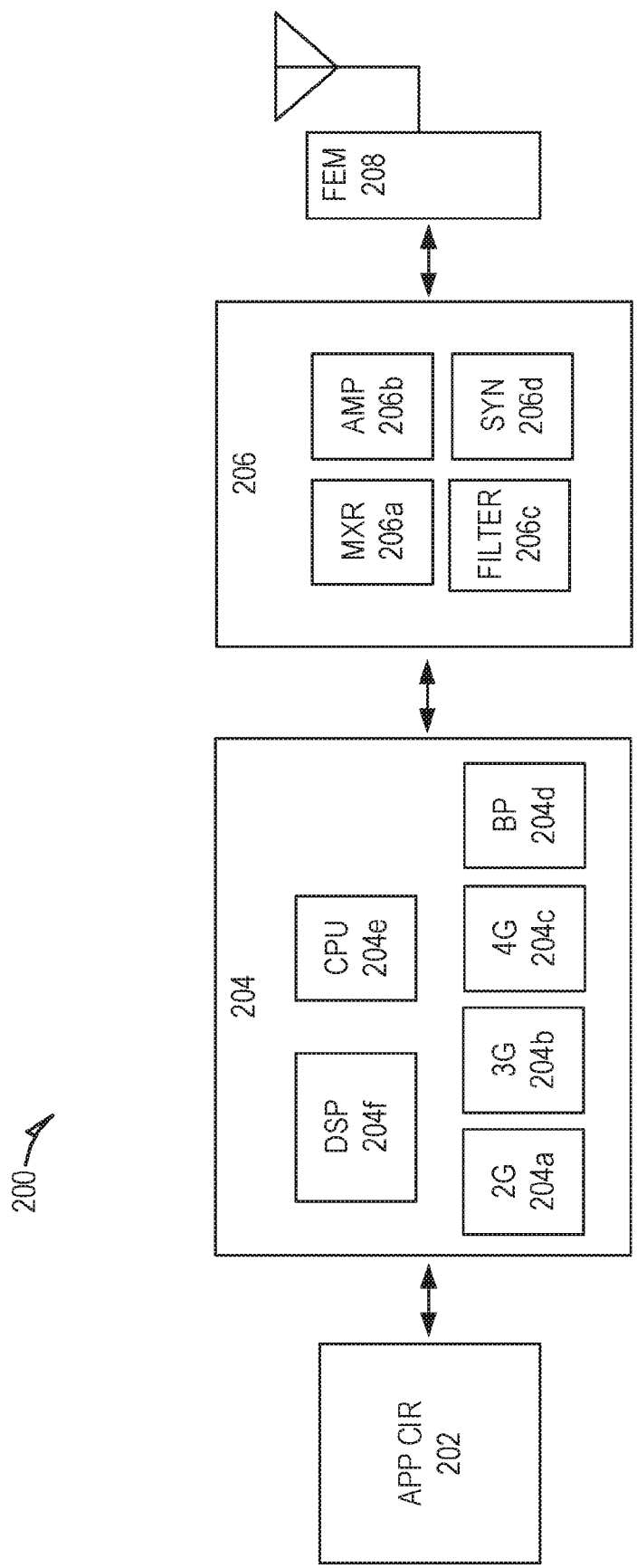
FIG. 2 illustrates components of an exemplary communication device in accordance with some aspects.

FIG. 2 illustrates components of a communication device in accordance with some aspects. The communication device 200 may be UE, eNB or other network component as described herein. The communication device 200 may be a stationary, non-mobile device or may be a mobile device.

In some aspects, the communication device 200 can be configured to operate in accordance with communication standards or other protocols or standards, including Institute of Electrical and Electronic Engineers (IEEE) 802.16 wireless technology (WiMax), IEEE 802.11 wireless technology (WiFi) including IEEE 802.11 ad, which operates in the 60 GHz millimeter wave spectrum, various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (UTRAN), Long Term Evolution (LTE), LTE-Advanced, or other technologies either already developed or to be developed.

In some aspects, the UE 200 may include application module 202, baseband module 204, Radio Frequency (RF) module 206, front-end module (FEM) module 208 and one or more antennas 210, coupled together at least as shown in FIG. 2. At least some of the baseband module 204, RF module 206, and FEM module 208 may form a transceiver. In some aspects, other network elements, such as the MME may contain some or all of the components shown in FIG. 2. In some aspects, the application module 202, the baseband module 204, the RF module 206, and/or the FEM module 208 can be implemented as circuitry, such as an integrated circuit or an integrated chip.

In some aspects, the application module 202 may include one or more application processors. For example, the application module 202 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

In some aspects, the baseband module 204 may include circuitry such as, but not limited to, one or more single-core or multi-core processors. The baseband module 204 may include one or more baseband processors and/or control logic to process baseband signals received from a receive signal path of the RF module 204 and to generate baseband signals for a transmit signal path of the RF module 206.

In some aspects, the baseband module 204 may interface with the application module 202 for generation and processing of the baseband signals and for controlling operations of the RF module 206. In some aspects, the baseband module 204 may be compatible with the second generation (2G) of the wireless mobile telecommunications technology, the third generation (3G) of the wireless mobile telecommunications technology, the fourth generation (4G) of the wireless mobile telecommunications technology, other existing wireless mobile telecommunications technologies, and/or future generations of wireless mobile telecommunications technologies such as the fifth generation (5G) wireless mobile telecommunications technology. For example, the baseband module 204 can include a 2G baseband processor 204a, a 3G baseband processor 204b, a 4G baseband processor 204c, and/or other baseband processor(s) 204d for other existing generations or generations in development or to be developed in the future (e.g., 5G).

In some aspects, the baseband module 204 (e.g., one or more of baseband processors 204a-d) may handle various radio control functions that enable communication with one or more radio networks via the RF module 206. The radio control functions may include, but are not limited to, signal modulation/demodulation, encoding/decoding, radio frequency shifting, etc. In some aspects, modulation/demodulation circuitry of the baseband module 204 may include Fast Fourier Transform (FFT), precoding, and/or constellation mapping/demapping functionality. In some aspects, encoding/decoding circuitry of the baseband module 204 may include convolution, tail-biting convolution, turbo, Viterbi, and/or Low Density Parity Check (LDPC) encoder/decoder functionality. Aspects of modulation/demodulation and encoder/decoder functionality are not limited to these examples and may include other suitable functionality in other aspects.

In some aspects, the baseband module 204 may include elements of a protocol stack such as, for example, elements of an E-UTRAN protocol including, for example, physical (PHY), media access control (MAC), radio link control (RLC), packet data convergence protocol (PDCP), and/or radio resource control (RRC) elements. A central processing unit (CPU) 204e of the baseband module 204 may be configured to run elements of the protocol stack for signaling of the PHY, MAC, RLC, PDCP and/or RRC layers.

In some aspects, the baseband module 204 may include one or more audio digital signal processor(s) (DSP) 204f. The audio DSP(s) 204f may be include elements for compression/decompression and echo cancellation and may include other suitable processing elements in other aspects.

Components of the baseband module may be suitably combined in a single chip, a single chipset, or disposed on a same circuit board in some aspects. In some aspects, some or all of the constituent components of the baseband module 204 and the application module 202 may be implemented together such as, for example, on a system on a chip (SOC).

In some aspects, the baseband module 204 may provide for communication compatible with one or more radio technologies. For example, in some aspects, the baseband module 204 may support communication with an E-UTRAN and/or other wireless metropolitan area networks (WMAN), a wireless local area network (WLAN), a wireless personal area network (WPAN). Aspects in which the baseband module 204 is configured to support radio communications of more than one wireless protocol may be referred to as multi-mode baseband module.

The RF module 206 may enable communication with wireless networks using modulated electromagnetic radiation through a non-solid medium. In various aspects, the RF module 206 may include switches, filters, and/or amplifiers to facilitate the communication with the wireless network. The RF module 206 may include a receive signal path, which may include circuitry to down-convert RF signals received from the FEM module 208 and provide baseband signals to the baseband module 204. The RF module 206 may also include a transmit signal path, which may include circuitry to up-convert baseband signals provided by the baseband module 204 and provide RF output signals to the FEM module 208 for transmission.

In some aspects, the receive signal path of the RF module 206 may include mixer module 206a, amplifier module 206b and filter module 206c. In some aspects, the transmit signal path of the RF module 206 may include filter module 206c and mixer module 206a. In some aspects, the RF module 206 may also include synthesizer module 206d for synthesizing a frequency for use by the mixer module 206a of the receive signal path and the transmit signal path.

In some aspects, the mixer module 206a of the receive signal path may be configured to down-convert RF signals received from the FEM module 208 based on the synthesized frequency provided by synthesizer module 206d. The amplifier module 206b may be configured to amplify the down-converted signals and the filter module 206c may be a low-pass filter (LPF) or band-pass filter (BPF) configured to remove unwanted signals from the down-converted signals to generate output baseband signals. Output baseband signals may be provided to the baseband module 204 for further processing. In some aspects, the output baseband signals may be zero-frequency baseband signals. In some aspects, mixer module 206a of the receive signal path may include passive mixers, although the scope of the aspects is not limited in this respect.

In some aspects, the mixer module 206a of the transmit signal path may be configured to up-convert input baseband signals based on the synthesized frequency provided by the synthesizer module 206d to generate RF output signals for the FEM module 208. The baseband signals may be provided by the baseband module 204 and may be filtered by filter module 206c. The filter module 206c may include a low-pass filter (LPF), although the scope of the aspects is not limited in this respect.

In some aspects, the mixer module 206a of the receive signal path and the mixer module 206a of the transmit signal path may include two or more mixers and may be arranged for quadrature down-conversion and/or up-conversion respectively. In some aspects, the mixer module 206a of the receive signal path and the mixer module 206a of the transmit signal path may include two or more mixers and may be arranged for image rejection (e.g., Hartley image rejection).

In some aspects, the mixer module 206a of the receive signal path and the mixer module 206a may be arranged for direct down-conversion and/or direct up-conversion, respectively. In some aspects, the mixer module 206a of the receive signal path and the mixer module 206a of the transmit signal path may be configured for super-heterodyne operation.

In some aspects, the output baseband signals and the input baseband signals may be analog baseband signals, although the scope of the aspects is not limited in this respect. In some alternate aspects, the output baseband signals and the input baseband signals may be digital baseband signals. In these alternate aspects, the RF module 206 may include analog-to-digital converter (ADC) and digital-to-analog converter (DAC) circuitry and the baseband module 204 may include a digital baseband interface to communicate with the RF module 206.

In some dual-mode aspects, a separate radio IC circuitry may be provided for processing signals for each spectrum, although the scope of the aspects is not limited in this respect.

In some aspects, the synthesizer module 206d may be a fractional-N synthesizer or a fractional N/N+1 synthesizer, although the scope of the aspects is not limited in this respect as other types of frequency synthesizers may be suitable. For example, synthesizer module 206d may be a delta-sigma synthesizer, a frequency multiplier, and/or a synthesizer including a phase-locked loop with a frequency divider.

The synthesizer module 206d may be configured to synthesize an output frequency for use by the mixer module 206a of the RF module 206 based on a frequency input and a divider control input. In some aspects, the synthesizer module 206d may be a fractional N/N+1 synthesizer.

In some aspects, frequency input may be provided by a voltage controlled oscillator (VCO). Divider control input may be provided by either the baseband module 204 or the application module 202 depending on the desired output frequency. In some aspects, a divider control input (e.g., N) may be determined from a look-up table based on a channel indicated by the application module 202.

The synthesizer module 206d of the RF module 206 may include a divider, a delay-locked loop (DLL), a multiplexer, and a phase accumulator. In some aspects, the divider may be a dual modulus divider (DMD) and the phase accumulator may be a digital phase accumulator (DPA). In some aspects, the DMD may be configured to divide the input signal by either N or N+1 (e.g., based on a carry out) to provide a fractional division ratio. In some example aspects, the DLL may include a set of cascaded, tunable, delay elements, a phase detector, a charge pump and a D-type flip-flop. In these aspects, the delay elements may be configured to break a VCO period up into Nd equal packets of phase, where Nd is the number of delay elements in the delay line. In this way, the DLL provides negative feedback to help ensure that the total delay through the delay line is one VCO period.

In some aspects, the synthesizer module 206d may be configured to generate an output signal oscillating at a carrier frequency. In some alternate aspects, the synthesizer module 206d may be configured to generate an output signal having an output frequency that is an integer multiple of the carrier frequency (e.g., twice the carrier frequency, or four times the carrier frequency). In such alternate aspects, the output signal from the synthesizer module 206 can be used in conjunction with a quadrature generator and a divider to generate multiple signals at the carrier frequency with different phases with respect to each other. In some aspects, the output frequency may be a local oscillator (LO) frequency ($f_{LO}$). In some aspects, the RF module 206 may include a complex (I/Q) to polar converter.

In some aspects, the FEM module 208 may include a transmit (TX)/receive (RX) switch to switch between the transmit mode and the receive mode. The FEM module 208 may include a receive signal path and a transmit signal path. The receive signal path of the FEM module 208 may include a low-noise amplifier (LNA) to amplify received RF signals and provide the amplified received RF signals as an output (e.g., to the RF module 206). The transmit signal path of the FEM module 208 may include a power amplifier (PA) to amplify input RF signals (e.g., provided by RF module 206), and one or more filters to generate RF signals for subsequent transmission (e.g., by one or more of the one or more antennas 210.)

In some aspects, the FEM circuitry 208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210.

The antennas 210 may include one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) aspects, the antennas 210 may be effectively separated to take advantage of spatial diversity and the different channel characteristics that may result.

In some aspects, the communication device 200 may include additional elements. For example, the communication device 200 can include memory/storage, display, camera, sensor, and/or input/output (I/O) interface as described in more detail below. In some aspects, the communication device 200 described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly.

In some aspects, the communication device 200 may include one or more user interfaces designed to enable user interaction with the system and/or peripheral component interfaces designed to enable peripheral component interaction with the system. For example, the communication device 200 may include one or more of a keyboard, a keypad, a touchpad, a display, a sensor, a non-volatile memory port, a universal serial bus (USB) port, an audio jack, a power supply interface, one or more antennas, a graphics processor, an application processor, a speaker, a microphone, and/or other I/O components. The display may be an LCD or LED screen including a touch screen. The sensor may include a gyro sensor, an accelerometer, a proximity sensor, an ambient light sensor, and/or a positioning unit. The positioning unit may communicate with components of a positioning network, e.g., a global positioning system (GPS) satellite.

Although the communication device 200 is illustrated as having several separate functional elements, one or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some aspects, the functional elements may refer to one or more processes operating on one or more processing elements.

Aspects may be implemented in one or a combination of hardware, firmware and software. Aspects may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some aspects may include one or more processors and may be configured with instructions stored on a computer-readable storage device.

Figure 3:
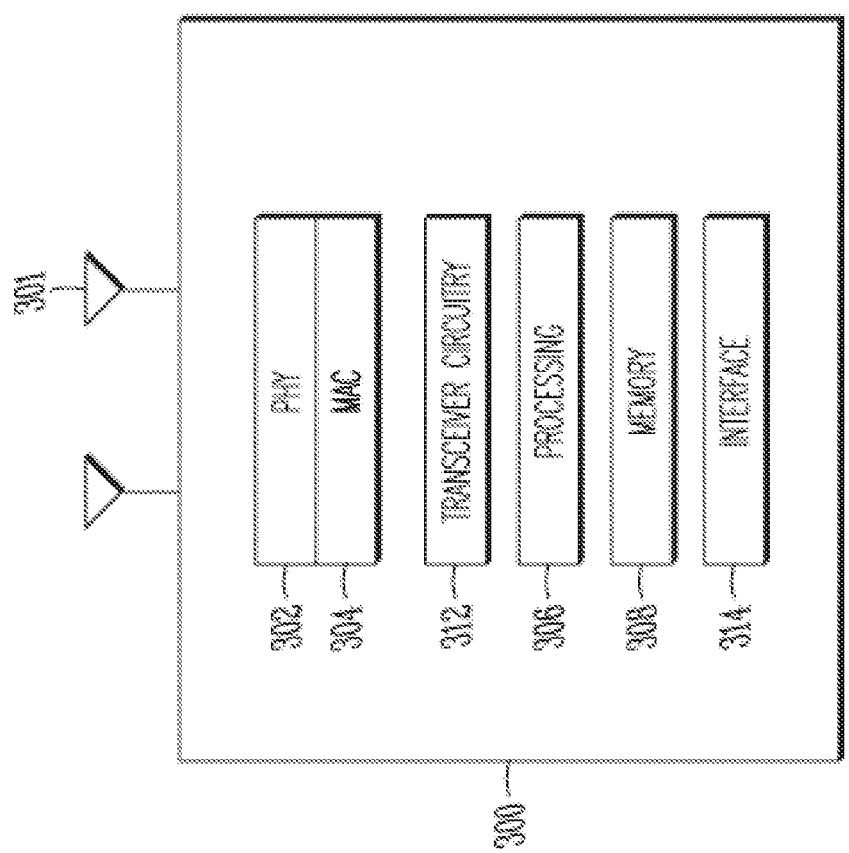
FIG. 3 illustrates a block diagram of a communication device in accordance with some aspects.

FIG. 3 is a block diagram of a communication device in accordance with some aspects. The communication device 300 may be UE, for example, such as the UE shown in FIG. 1.

The physical layer module 302 may perform various encoding and decoding functions that may include formation of baseband signals for transmission and decoding of received signals. The communication device 300 may also include medium access control layer (MAC) module 304 for controlling access to the wireless medium. The communication device 300 may also include processing module 306, such as one or more single-core or multi-core processors, and memory 308 arranged to perform the operations described herein.

The communication device 300 may include a transceiver module 312 to enable communication with other external devices wirelessly and interfaces 314 to enable wired communication with other external devices. As another example, the transceiver circuitry 312 may perform various transmission and reception functions such as conversion of signals between a baseband range and a Radio Frequency (RF) range. In some embodiments, the physical layer module 302, the MAC, module, the processing module 306, the transceiver module 312, and/or interfaces 314 may be implemented using circuitry, such as integrated circuits or integrated chip.

In some aspects, the antennas 301 may include one or more directional or omnidirectional antennas, including, for example, dipole antennas, monopole antennas, patch antennas, loop antennas, micro-strip antennas or other types of antennas suitable for transmission of RF signals. In some MIMO aspects, the antennas 301 may be effectively separated to take advantage of spatial diversity and the different channel characteristics that may result.

In some aspects, the physical layer module 302, the MAC module 304, and the processing module 306 may handle various radio control functions that enable communication with one or more radio networks compatible with one or more radio technologies. The radio control functions may include signal modulation, encoding, decoding, radio frequency shifting, etc. For example, similar to the device shown in FIG. 2, in some aspects, communication may be enabled with one or more of a WMAN, a WLAN, and a WPAN. In some aspects, the communication device 300 can be configured to operate in accordance with 3GPP standards or other protocols or standards, including WiMax, WiFi, WiGig, GSM, EDGE, GERAN, UMTS, UTRAN, or other 2G, 3G, 4G, 5G, etc. technologies either already developed or to be developed.

Although the communication device 300 is illustrated as having several separate functional elements, one or more of the functional elements may be combined and may be implemented by combinations of software-configured elements, such as processing elements including DSPs, and/or other hardware elements. For example, some elements may include one or more microprocessors, DSPs, FPGAs, ASICs, RFICs and combinations of various hardware and logic circuitry for performing at least the functions described herein. In some aspects, the functional elements may refer to one or more processes operating on one or more processing elements. Aspects may be implemented in one or a combination of hardware, firmware and software. Aspects may also be implemented as instructions stored on a computer-readable storage device, which may be read and executed by at least one processor to perform the operations described herein.

Figure 4:
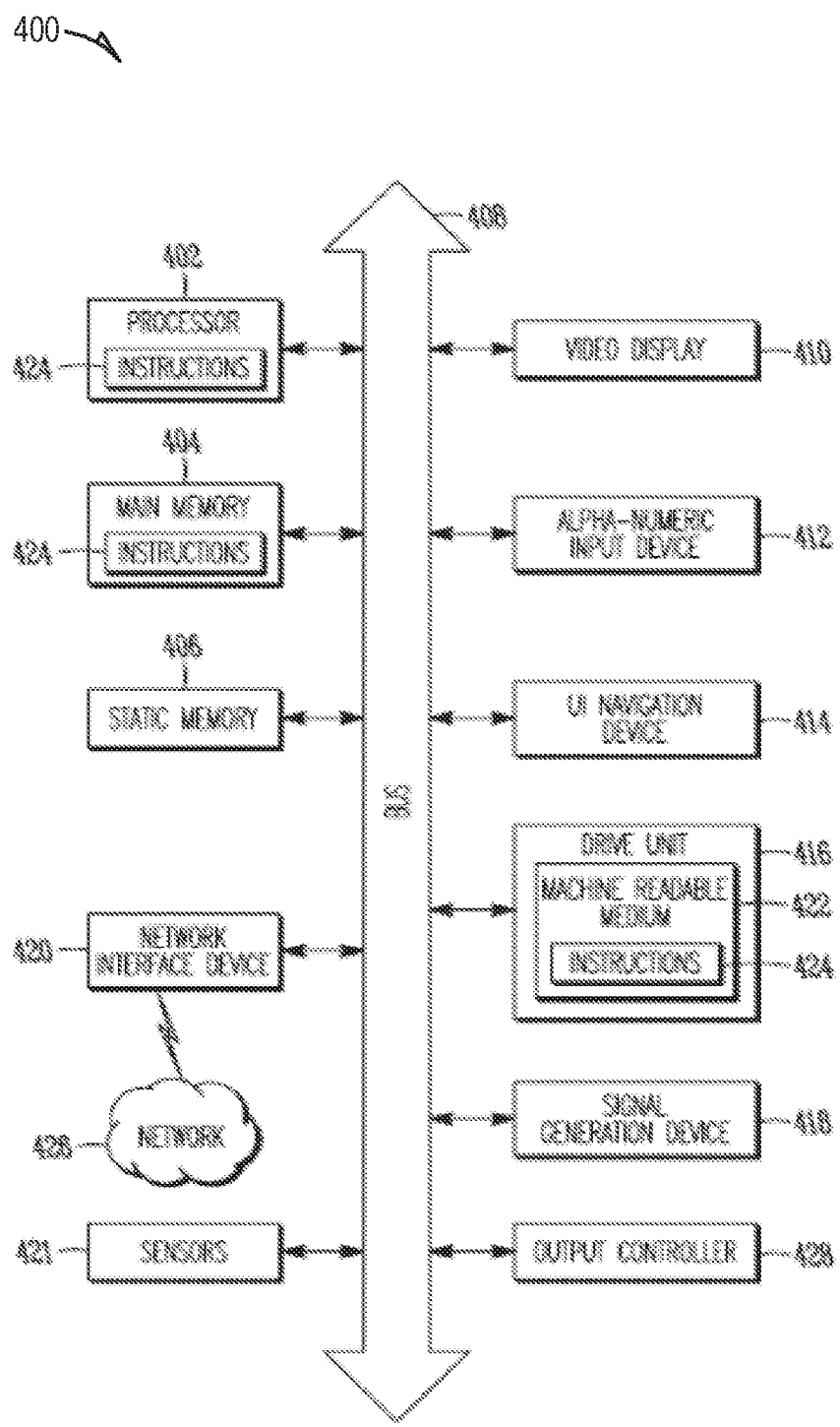
FIG. 4 illustrates another block diagram of a communication device in accordance with some aspects.

FIG. 4 illustrates another block diagram of a communication device in accordance with some aspects. In alternative aspects, the communication device 400 may operate as a standalone device or may be connected (e.g., networked) to other communication devices. In a networked deployment, the communication device 400 may operate in the capacity of a server communication device, a client communication device, or both in server-client network environments.

In an example, the communication device 400 may act as a peer communication device in peer-to-peer (P2P) (or other distributed) network environment. The communication device 400 may be UE, an eNB, a personal computer (PC), a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module in an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired using circuitry), or configured (e.g., programmed) to operate in a specified manner or to perform part or all of any operation described herein. Considering examples in which modules are configured, each of the modules need not be instantiated at any one moment in time. For example, where the modules include a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 400 (e.g., computer system) may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408.

The communication device 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display.

The communication device 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The communication device 400 may include an output controller 428, such as a serial (e.g., universal serial bus (USB), parallel, or other wired or wireless (e.g., infrared (IR), near field communication (NFC), etc. connection to communicate or control one or more peripheral devices (e.g., a printer, card reader, etc.).

The storage device 416 may include a communication device readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the communication device 400. In an example, one or any combination of the hardware processor 402, the main memory 404, the static memory 406, or the storage device 416 may constitute the communication device readable medium 422.

While the communication device readable medium 422 is illustrated as a single medium, the term "communication device readable medium" may include a single medium or multiple media (e.g., a centralized or distributed database, and/or associated caches and servers) configured to store the one or more instructions 424.

The term "communication device readable medium" may include any medium that is capable of storing, and/or carrying instructions for execution by the communication device 400 and that cause the communication device 400 to perform any one or more of the techniques of the present disclosure, or that is capable of storing, encoding or carrying data structures used by or associated with such instructions. Non-limiting examples of the communication device readable medium 422 may include solid-state memories, and optical and magnetic media. Specific examples of communication device readable media 422 may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device readable media may include non-transitory communication device readable media. In some examples, communication device readable media may include communication device readable media that is not a transitory propagating signal.

The instructions 424 may further be transmitted or received over a communications network 426 via the network interface device 420 that is compatible with one or more transfer protocols (e.g., frame relay, internet protocol (IP), transmission control protocol (TCP), user datagram protocol (UDP), hypertext transfer protocol (HTTP), etc.). Example communication networks 426 may include a local area network (LAN), a wide area network (WAN), a packet data network (e.g., the Internet), mobile telephone networks (e.g., cellular networks), Plain Old Telephone (POTS) networks, and/or wireless data networks (e.g., IEEE 802.11 family of standards known as WiFi®, IEEE 802.16 family of standards known as WiMax®), IEEE 802.15.4 family of standards, a LTE family of standards, a UMTS family of standards, peer-to-peer (P2P) networks, among others.

In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), MIMO, or multiple-input single-output (MISO) techniques. In some examples, the network interface device 420 may wirelessly communicate using Multiple User MIMO techniques.

Figure 5:
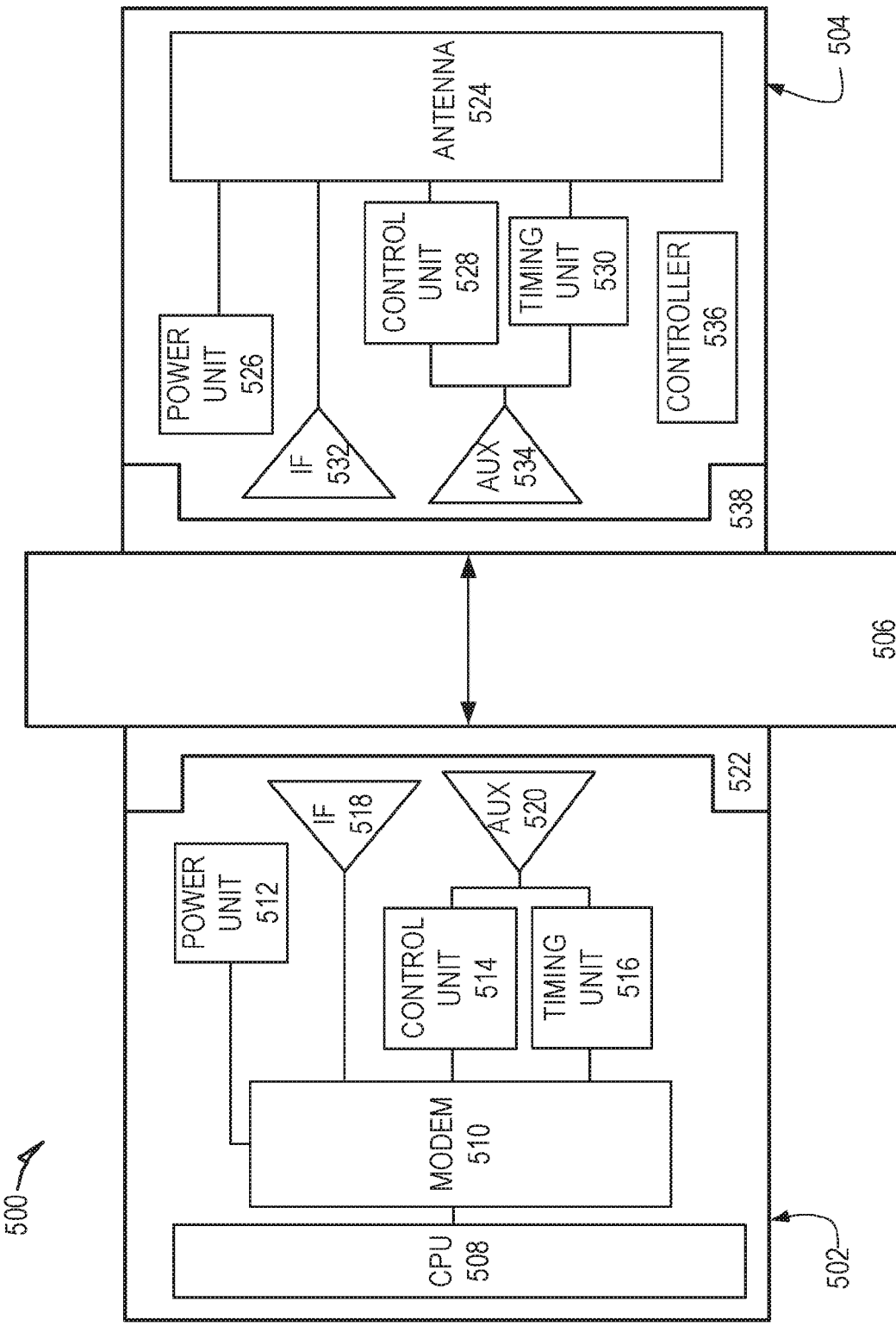
FIG. 5 is a block diagram of a Wireless Remote Radio Head system architecture in accordance with some aspects.

FIG. 5 is a block diagram of a Wireless Remote Radio Head (WRRH) system architecture 500 according to some aspects. The WRRH 500 is a radio communication system that includes two or more separate units that are capable of communicating bi-directionally through a lossy medium. In some aspects, the WRRH 500 includes a baseband module and a radio unit. In some aspects, the baseband module is configured to be deployed indoors and the radio unit is configured to be deployed outdoors. A lossy medium is a medium that absorbs a significant amount of the electromagnetic energy contained in a propagating information signal as the information signal passes through the medium, per unit distance traveled by the signal, resulting in signal attenuation. A lossy medium may include any solid or liquid barrier that attenuates an information signal, for example, a window, wall, door, or the like. Certain lossy mediums, such as glass, pose particular challenges in attenuating information signals, especially glass that is covered by a glaze and/or tinting material. As a result of passing through certain lossy mediums, the magnitude of an information signal may be attenuated enough such that a receiver positioned on an opposing side of a lossy medium may be incapable of receiving the information signal and/or incapable of processing the received information signal.

In some aspects, the WRRH 500 is part of a small cell, a home gateway, or connected vehicles with a communication system operating within a mobile network system (e.g., a 5G mobile network system) and is capable of communicating within a variety of frequency bands. For example, Ultra High Frequency (UHF) bands, Super High Frequency (SHF) and Extremely High Frequency (EHF) bands, which may include communication technologies such as microwave communication devices, mobile phones (e.g., 5G mobile phones), wireless LANs and small cells, among other UE and devices.

In some aspects, the WRRH 500 can be configured to operate with other technologies that also utilize frequency bands within the invisible spectrum. For example, the WRRH 500 can be configured to operate with infrared (IrDA) devices and induction coupling devices (e.g., wireless power devices), and technologies that utilize frequency bands within the visible spectrum, for example, LED and laser technologies.

In some aspects, the WRRH 500 includes a baseband module 502 and a radio unit 504 that are separated by and communicate bi-directionally and wirelessly through a lossy medium (e.g., a window 506). In some aspects, the baseband module 502 and the radio unit 504 are both capable of receiving and transmitting wireless and hardwired communication signals. For example, the baseband module 502 may receive and transmit signals to and from a device or UE (e.g., mobile device, wireless router) inside of a structure, and the radio unit 504 may receive and transmit signals to and from a base station (e.g., 5G base station) or UE (e.g., mobile device, wireless router) outside of the structure.

In some aspects, the baseband module 502 and the radio unit 504 include a baseband subsystem and a radio subsystem of the WRRH 500 system, respectively. In some aspects, where the WRRH 500 is divided into a baseband subsystem (e.g., baseband module 502) and a radio subsystem (e.g., radio unit 504), the baseband module 502 and the radio unit 504 communicate information signals via a modulated intermediate frequency (IF) signal. Alternatively, the baseband module 502 and the radio unit 504 can communicate information signals utilizing a baseband signal (e.g., analog baseband signal). Communication between the baseband module 502 and the radio unit 504 can be in the form of wireless information signals (e.g., wireless IF signal, wireless analog baseband signal) or wired (e.g., or baseband signal via coaxial cable). Wireless and wired information signals can include both data and control signals.

In some aspects, the baseband module 502 includes processing circuitry, which may include one or more processors (e.g., CPU 508), a modem 510 (e.g., WiGig, mmWave 5G modem), a power unit 512, a control unit 514, a timing unit 516, an information signal antenna 518, an auxiliary information antenna 520, and an attachment mechanism (e.g., magnetic strip or suction cup) 522 for attaching the baseband module 502, for example, to a window or other surface. In some aspects, the baseband module 502 is coupled with a power source (e.g., AC power source).

In some aspects, the radio unit 504 includes an antenna 524, a power unit 526, a control unit 528, a timing unit 530, an information signal antenna 532, and auxiliary information antenna 534, a controller 536, and an attachment mechanism (e.g., magnetic strip or suction cup) 538 for attaching the radio unit 504, for example, to a window or other surface.

In one aspect, the WRRH 500 (e.g., the baseband module 502 and the radio unit 504) operates within a small cell or a home gateway communication system. The radio unit 504 receives a communication signal from a base station (e.g., a macro eNB 104a), transmits the signal through a lossy medium (e.g., window) to the baseband module 502, and the baseband module 502 redistributes the signal to one or more mobile devices 102. In some aspects, the baseband module 502 redistributes the signal inside a structure (e.g., a home or any enclosed environment or non-enclosed environment that is obstructed by a lossy medium) to one or more mobile devices 102 within the structure.

Likewise, the baseband module 502 receives a communication signal from mobile devices 102, transmits the signal through the lossy medium to the radio unit 504, and the radio unit 504 transmits the received signal to a base station (e.g., a macro eNB 104a). Thus, the WRRH 500 operates in a bi-directional manner, wherein communication or information signals between the baseband module 502 and the radio unit 504 are propagated in at least two directions, from the baseband module 502 to the radio unit 504 and from the radio unit 504 to the baseband module 502.

In some aspects, the CPU 508 is coupled, through a wire or wirelessly, with one or more devices or UE. For example, a device or UE can include a mobile device, wireless router (e.g., Wi-Fi router, WiGig router), Ethernet-enabled component, a cellular booster or small cell device, among other devices or UE. In some aspects, the CPU 508 may be included within, or external to, the baseband module 502. The CPU 508 can be configured to provide computational resources to the WRRH 500, for example, managing incoming and outgoing data from the WRRH 500, managing certain computational operations in concert with the modem 510, managing operations for a local small cell, managing communications for a hotspot device, and managing Internet protocols communications.

In some aspects, because the baseband module 502 and the radio unit 504 each include multiple components, the baseband module 502 and the radio unit 504 are configured to pair to one another (e.g., mutual registration of information) and transfer data, power and control information. Pairing between the baseband module 502 and the radio unit 504 is accomplished through a pairing protocol, for example, via Bluetooth or other pairing protocols. In some aspects, the CPU 508 is also capable of being utilized to enable pairing (e.g., mutual registration of information) between the baseband module 502 and the radio unit 504.

In some aspects, the modem 510 is coupled with the CPU 508 and receives information signals from the CPU 508. For example, signal inputs to the modem 510 from the CPU 508 can include any information signal from a device or UE (e.g., UE inside a structure) that is intended to be wirelessly transmitted outside of the structure (e.g., outside of a structure as part of a small cell or home gateway communication system). Additionally, the baseband module 502 (e.g., the modem 510 within the baseband module 502) includes one or more antennas for receiving wireless information signals from a device or UE (e.g., UE inside a structure) that is intended to be wirelessly transmitted outside of the structure (e.g., outside of a structure as part of a small cell or home gateway communication system).

Signal inputs from the modem 510 to the CPU 508 can include any information signal that has been received from the radio unit 504, and transmitted to the baseband module 502, that is intended to be transmitted, as a wireless or wired signal. For example, the baseband module 502 may transmit information signals received from the radio unit 504 to a device or UE inside a structure (e.g., structure that the home gateway communication system is operating within). The modem 510 is capable of modulation, demodulation, up-conversion and down-conversion of an information signal. Therefore, the modem 510 is able to receive an information signal from the CPU 508, modulate the information signal, up-convert the modulated information signal to IF (e.g., any intermediate frequency that is capable of penetrating a given lossy medium) or other frequencies, and output an analog IF signal. In some aspects, the modem 510 utilizes different operations (e.g., does not up convert) and alternatively outputs a different analog signal (e.g., analog baseband signal).

The baseband module 502 also includes a power unit 512. The power unit 512 is configured to provide power to certain components within the WRRH 500. In some aspects, the power unit 512 provides power from the baseband module 502 to the radio unit 504, and can be coupled to the modem 510. In some aspects, the baseband module 502 is powered by a power source (e.g., AC power source) and operates as an active component by controlling the amount of power that is delivered to the radio unit 504.

In some aspects, the radio unit 504 operates as a passive component that receives power from the baseband module 502 radio unit through the power unit 512. In some aspects, in order for the baseband module 502 to distribute power to the radio unit 504 wirelessly, the power unit 512 can include a wireless power charger (e.g., coil) (not shown) that implements inductive coupling between the baseband module 502 and the radio unit 504. In alternative aspects, the power unit 512 delivers power to the radio unit through a wire (e.g., coaxial cable), or the radio unit 504 independently produces or receives power locally and does not rely on the baseband module 502 for power.

In some aspects, the power unit 512 also includes components (e.g., voltage regulator) to regulate the amount of power that is distributed within the baseband module 502 and to the radio unit 504. The power unit 512 may also be capable of transmitting certain control signals from the baseband module 502 to the radio unit 504.

In some aspects, the baseband module 502 includes a control unit 514, which provides control signals (e.g., 3 bit information signal) to certain components within the WRRH 500. The control unit 514 can provide control signals to the radio unit 504 and can be coupled with the modem 510. By transmitting control signals, the control unit 514 is capable of managing a communication session between the baseband module 502 and the radio unit 504 (e.g., initiating communication, ending communication) and controlling the antenna 524.

In some aspects, the control unit 514 transmits one or more control signals that cause the antenna 524 (e.g., causes elements of a phased array antenna) to perform certain actions (e.g., turn on/off, transmit, receive, beamforming in a particular direction, adjust gain, phase and channelization). In some aspects, the control unit 514 outputs control signals that may be transmitted wirelessly "in-band," or within the same channel or frequency as information signals (e.g., analog IF signal, analog baseband signal) that are transmitted from the output of the modem 510. In some alternate aspects, the control unit 514 outputs control signals wirelessly "out-of-band," or within a channel or frequency separate from the channel or frequency of the information signal.

In some aspects, the control unit 514 outputs control signals that are wirelessly transmitted via antenna, for example, through the auxiliary information antenna 520 or, alternatively, through the information signal antenna 518. Additionally, the control unit 514 can output control signals that are transmitted via laser or through a wire (e.g., coaxial cable). Additionally, it is contemplated that certain control signals may also be transmitted by devices utilizing visible (e.g., LED), invisible (e.g., IrDA) or powerline (e.g., inductive coupling) pathways.

In some aspects, the baseband module 502 includes a timing unit 516 (e.g., reference clock generator), which provides a reference timing for synchronization of the system components of the WRRH 500, such as the baseband module 502 and the radio unit 504. In some aspects, the timing unit 516 outputs a reference clock signal and transmits the reference clock to the radio unit 504 so that the radio unit 504 operates from the reference clock. Alternatively, the reference clock signal is locally generated at both the baseband module 502 and the radio unit 504.

In some aspects, the timing unit 516 transmits the reference clock signals "in-band," or within the same channel or frequency as information signals (e.g., analog IF signal, analog baseband signal) that are transmitted from the output of the modem 510. Alternatively, the timing unit 516 transmits the reference clock signals "out-of-band," or within a channel or frequency separate from the channel or frequency of the information signal.

In some aspects, the timing unit 516 outputs reference clock signals that are wirelessly transmitted via antenna, for example, through the auxiliary information antenna 520 or through the information signal antenna 518. Alternatively, the timing unit 516 may transmit reference clock signals via laser or through a wired coupling (e.g., coaxial cable). Additionally, it is contemplated that certain reference clock signals may also be transmitted by devices utilizing visible (e.g., LED), invisible (e.g., IrDA) or powerline (e.g., inductive coupling) pathways, among other means.

In some aspects, the baseband module 502 includes an information signal antenna 518 (e.g., IF antenna, baseband antenna) which provides a wireless pathway for an information signal (e.g., wireless analog IF signal, wireless analog baseband signal). The information signal antenna 518 may include, for example, a waveguide and horn antenna, a single patch antenna, or a multi-patch array antenna, among other antenna means. As previously discussed, the modem 510 can be configured to output an IF signal or other frequency signal. Alternatively, the modem 510 may output an analog baseband signal.

In some aspects, the information signal antenna 518 is configured to receive an IF signal and transmit the IF signal wirelessly through the lossy medium 506 (e.g., window) to the radio unit 504. Additionally, it is contemplated that certain information signals (e.g., IF signals, baseband signals) may also be transmitted by devices utilizing visible (e.g., LED), invisible (e.g., IrDA) or powerline (e.g., inductive coupling) pathways, among other means.

In some aspects, the baseband module 502 includes an auxiliary information antenna 520, which provides a wireless pathway for an auxiliary information signal (e.g., control signal, reference clock signal). The auxiliary information antenna 520 may include, for example, a waveguide and horn antenna, a single patch antenna, or a multi-patch array antenna, among other antenna means.

In some aspects, the auxiliary information antenna 520 can be configured to receive a control signal from a control unit 514, and/or a reference clock signal from the timing unit 516, and transmit the control signal/or and the reference clock signal through the lossy medium 506 (e.g., window) to the radio unit 504. Additionally, it is contemplated that certain auxiliary information signals (e.g., control signals, reference clock signals) may also be transmitted by devices utilizing visible (e.g., LED), invisible (e.g., IrDA) or powerline (e.g., inductive coupling) pathways, among other means.

In some aspects, the IF signal or analog baseband signal can be transmitted along with the control signal and/or the reference clock signal over the same transmission path. For example, the IF signal or analog baseband signal can be transmitted along with the control signal and/or the reference clock signal using the same antenna or the same hardwired transmission path.

In some aspects, the baseband module 502 includes an attachment mechanism 522 for attaching the baseband module 502 to the lossy medium (e.g., window). In some aspects, where the lossy medium is a window, the attachment mechanism 522 can include a magnetic element (e.g., magnetic strip) that attaches to the window by way of the adjacent alignment of the attachment mechanism 538 of the radio unit 504 on the opposite side of the window. Where the attachment mechanism 522 of the baseband module 502 and the attachment mechanism 538 of the radio unit 504 include a magnetic element, such qualities cause the baseband module 502 and the radio unit 504 to be capable of maintaining alignment during attachment to the window, as the magnetic field transmits through the lossy medium. Alternatively, the attachment mechanism 522 of the baseband module 502 and the attachment mechanism 538 of the radio unit 504 may be implemented by other attachment means, for example, by a suction mechanism (e.g., suction cup) or by pins.

In some aspects, the antenna 524 of the radio unit 504 includes an antenna array (e.g., phased array antenna) and is coupled with a power unit 526, a control unit 528, a timing unit 530, and an information signal antenna 532. The antenna 524 can be configured to perform up-conversion and down-conversion of an information signal, and may be configured to perform such actions on both a received wireless signal from outside of a structure or home (e.g., a received wireless RF signal) and a received signal from the baseband module 502, for example, an IF signal. Therefore, between the antenna 524 of the radio unit 504 and the modem 510 of the baseband module 502, the WRRH 500 performs the two-stage up-conversion or the two-stage down-conversion of information signals.

In some aspects, the radio unit 504 includes a power unit 526, which provides power to components within the radio unit 504, for example the antenna 524. In some aspects, the power unit 526 is coupled with the antenna 524 and provides power from the baseband module 502, through wireless inductive coupling, to the antenna 524. Alternatively, the power unit 526 provides local power to the radio unit 504 (e.g., antenna 524) without wireless inductive coupling to the baseband module 502, or provides power to the radio unit 504 through a wire with the baseband module 502 (e.g., coaxial cable). In some aspects, the power unit 526 also includes components (e.g., voltage regulator) to regulate the amount of power that is distributed within the radio unit 504 and to the antenna 524.

In some aspects, the power unit 526 can also be capable of transmitting certain control signals to the antenna 524, for example, control signals received from the baseband module 502 through the coupling of the power unit 512 of the baseband module 502 with the power unit 526 of the radio unit 504. Control signals from the power unit 526 are capable of programming the antenna 524 (e.g., programming the elements of the phased array antenna), for example, by providing on/off, transmit, receive and beamforming commands, and adjusting gain and channelization.

The radio unit 504 also includes a control unit 528, which provides control signals (e.g., 3 bit information) to certain components within the radio unit 504. In some aspects, the control unit 528 is coupled with the antenna 524 and provides control signals to the antenna 524. In some aspects, the control unit 528 transmits control signals received from the baseband module 502 that cause the antenna 524 (e.g., cause elements of a phased array antenna) to perform certain actions (e.g., turn on/off, transmit, receive, beamforming in a particular direction, adjust gain, adjust channelization).

In some aspects, the radio unit 504 also includes a timing unit 530 (e.g., reference clock generator), which provides a reference timing for synchronization of the communications transmitted from the radio unit 504 to the baseband module 502, as well as for synchronization of the components of the radio unit 504. In some aspects, the timing unit 530 outputs a reference clock signal that is wirelessly transmitted between the radio unit 504 and the baseband module 502, for example, through the auxiliary information antenna. 534. Alternatively, the reference clock signal is locally generated.

In some aspects, the timing unit 530 is configured to transmit reference clock signals "in-band," or within the same channel or frequency as information signals (e.g., analog IF signal, analog baseband signal) that are transmitted from the output of the antenna 524. Alternatively, the timing unit 530 is configured to transmit reference clock signals "out-of-band," or within a channel or frequency separate from the channel or frequency of the information signal. In some aspects, an "in-band" configuration includes a wire or transmission cable (e.g., coaxial cable) that transmits both control signals (e.g., reference clock signals) and information signals. Alternatively, an "out-of-band" configuration includes transmitting control signals on a separate path from the information signals. In some aspects, an "out-of-band" configuration includes a medium (e.g., laser, LED, IrDA) that transmits control signals separate from the medium that transmits information signals.

In some aspects, the timing unit 530 outputs reference clock signals that are wirelessly transmitted via antenna, for example, through the auxiliary information antenna 534 or through the information signal antenna 532. Alternatively, the timing unit 530 may transmit reference clock signals via laser or through a wire (e.g., coaxial cable). Additionally, it is contemplated that certain reference clock signals may also be transmitted by devices utilizing visible (e.g., LED), invisible (e.g., IrDA) or powerline (e.g., inductive coupling) pathways, among other means.

In some aspects, the radio unit 504 includes an information signal antenna 532 (e.g., IF antenna, baseband antenna) which provides a wireless pathway for an information signal (e.g., wireless IF signal, wireless analog baseband signal). The information signal antenna 532 may include, for example, a waveguide and horn antenna, a single patch antenna, or a multi-patch array antenna, among other antenna means. The antenna 524 is capable of outputting an IF or other frequency signal. Alternatively, the antenna 524 may output an analog baseband signal. In some aspects, an IF signal or other frequency is received at the input of the information signal antenna 532 and the information signal antenna 532 transmits the IF signal wirelessly through the lossy medium 506 (e.g., window) to the baseband module 502. Additionally, it is contemplated that certain information signals (e.g., IF signals, baseband signals) may also be transmitted by devices utilizing visible (e.g., LED), invisible (e.g., IrDA) or powerline (e.g., inductive coupling) pathways, among other means.

In some aspects, the radio unit 504 includes an auxiliary information antenna 534, which provides a wireless pathway for an auxiliary information signal (e.g., control signal, reference clock signal). The auxiliary information antenna 534 may include, for example, a waveguide and horn antenna, a single patch antenna, or a multi-patch array antenna, among other antenna means.

In some aspects, the auxiliary information antenna 534 can be configured to receive a control signal from a control unit 528, and/or a reference clock signal from the timing unit 530, and transmit the control signal/or and the reference clock signal through the lossy medium 506 (e.g., window) to the baseband module 502.

Additionally, it is contemplated that certain auxiliary information signals (e.g., control signals, reference clock signals) may also be transmitted by devices utilizing visible (e.g., LED), invisible (e.g., IrDA) or powerline (e.g., inductive coupling) pathways, among other means.

In some aspects, the IF signal or analog baseband signal can be transmitted with the control signal and reference clock signal together over the same transmission path (e.g., using the same antenna or the same hardwired transmission path).

In some aspects, the radio unit 504 includes a controller 536. The controller 536 is a control unit within the radio unit 504 that comprises, for example, a microcontroller or FPGA that controls the components of the radio unit 504. In some aspects, the controller 536 controls power management of the radio unit 504, the antenna 524 (e.g., training of the antenna patterns, transmit power and receive power of the antenna.

In some aspects, for communication between the baseband module 502 and radio unit 504 to be coordinated, the baseband module 502 and radio unit 504 are paired together. The controller 536 can be configured to control the pairing between the baseband module 502 and the radio unit 504, in order to coordinate communication. For example, the controller 536 can be configured to perform the mutual registration of information associated with the two units and enable communication via Bluetooth or other pairing protocols.

In some aspects, the CPU 508 and the controller 536 operate to pair the baseband module 502 with the radio unit 504, including pairing of power between the baseband module 502 and radio unit 504, pairing of information and control signals, and pairing of the clock signal, among other aspects.

The radio unit 504 also includes an attachment mechanism 538 (e.g., magnetic strip, suction cup, pins) for attaching the radio unit 504 to a surface, for example, a surface that includes a lossy medium. In some aspects, where the lossy medium is a window, the attachment mechanism 538 can be attached to or coupled to the window by way of the adjacent alignment of the attachment mechanism 522 of the baseband module 502 on the opposite side of the window. Where the attachment mechanism 538 of the radio unit 504 and the attachment mechanism 522 of the baseband module 502 include a magnetic element, the baseband module 502 and the radio unit 504 maintain alignment during attachment to the window.

Figure 6:
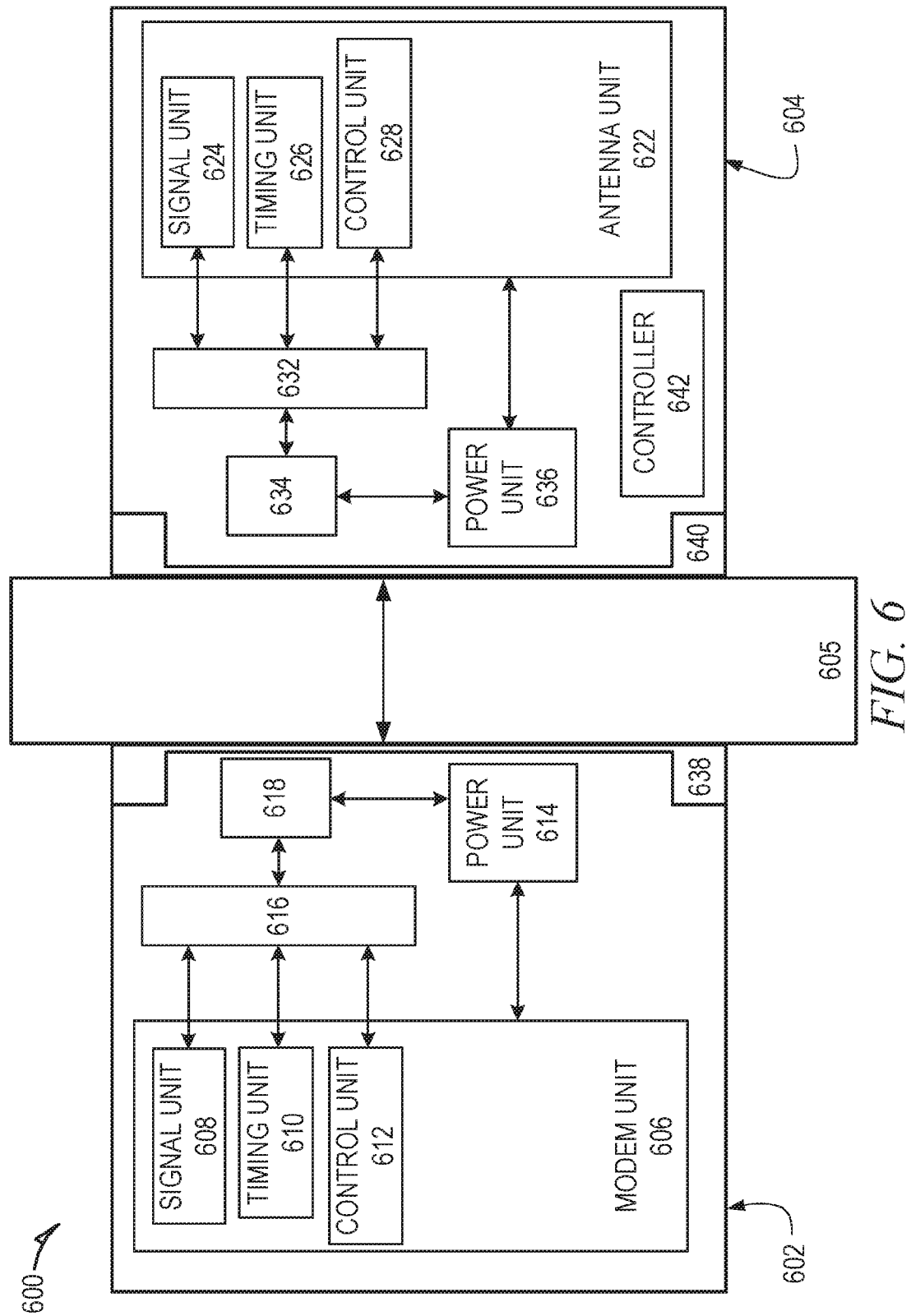
FIG. 6 is a block diagram of a Wireless Remote Radio Head system architecture in accordance with some aspects.

FIG. 6 is a block diagram of a Wireless Remote Radio Bead (WRRH) system architecture 600 according to some aspects. Similar to WRRH 500 of FIG. 5, the WRRH 600 is a radio communication system that includes two or more units (e.g., a baseband module and a radio unit) that are capable of communicating through a lossy medium. A lossy medium, for example, may be a window. The WRRH 600 can be configured to communicate through other lossy mediums, such as a wall, or any other solid or liquid barrier that is capable of attenuating a wireless signal. In some aspects, the WRRH 600 is part of a small cell or a gateway communication system (e.g., home gateway communication system) operating within a mobile network system (e.g., a 5G mobile network system) and is capable of communicating within a variety of frequency bands. For example, Ultra High Frequency (UHF) bands, Super High Frequency (SHF) and Extremely High Frequency (EHF) bands, which include may include communication technologies such as microwave communication devices, mobile phones (e.g., 5G mobile phones), wireless LANs and small cells, among other UE and devices.

In some aspects, the WRRH 600 can be configured to operate with other technologies that also utilize frequency bands within the invisible spectrum. For example, the WRRH 600 can be configured to operate with infrared (IrDA) devices and induction coupling devices (e.g., wireless power devices), and technologies that utilize frequency bands within the visible spectrum, for example, LED and laser technologies.

In some aspects, the WRRH 600 includes a baseband module 602 and a radio unit 604 that are separated by and communicate bi-directionally through a lossy medium 605. In some aspects, the baseband module 602 and the radio unit 604 are both capable of receiving and transmitting wireless and hardwired communication signals. For example, the baseband module 602 may receive and transmit signals to and from a device or UE (e.g., mobile device, wireless router) inside of a structure, and the radio unit 604 may receive and transmit signals to and from a base station (e.g., 5G base station) or UE (e.g., mobile device, wireless router) outside of the structure.

In some aspects, the baseband module 602 and the radio unit 604 include a baseband subsystem and a radio subsystem of the WRRH 600 system, respectively. In some aspects, where the WRRH 600 is divided into a baseband subsystem (e.g., baseband module 602) and a radio subsystem (e.g., radio unit 604), the baseband module 602 and the radio unit 604 communicate information signals via a modulated intermediate frequency (IF) signal. Alternatively, the baseband module 602 and the radio unit 604 may communicate, simultaneously and/or concurrently, information signals utilizing a baseband signal (e.g., analog baseband signal). Communication between the baseband module 602 and the radio unit 604 can be in the form of wireless information signals (e.g., wireless IF signal, wireless analog baseband signal) or wired (e.g., IF or baseband signal via coaxial cable). Wireless and wired information signals can include both data and control signals.

In some aspects, the baseband module 602 includes a modem unit 606, a signal unit 608, a timing unit 610, a control unit 612 and a power unit 614. The signal unit 608, timing unit 610, and control unit 612 may be internal to the modem unit 606 or, alternatively, external to the modem unit 606. Additionally, in some aspects (e.g., a wired configuration), the baseband module 602 further comprises one or more multiplexing devices 616 and 618, for example, frequency-domain multiplexing devices. In some aspects, multiplexing device 616 and multiplexing device 618 are a triplexer and diplexer, respectively.

Alternatively, in some aspects (e.g., a wireless configuration), the baseband module 602 does not include multiplexing devices and instead includes one or more antennas (e.g., information signal antenna, auxiliary information antenna). Additionally, in other aspects, the baseband module 602 includes alternative means for transmitting information or control signals via visible (e.g., LED), invisible (e.g., IrDA) or powerline (e.g., inductive coupling) pathways, among other means. The baseband module 602 also comprises an attachment mechanism (e.g., magnetic strip or suction cup) 638 for attaching the baseband module 602 to a window or other surface. In some aspects, the indoor unit 602 is coupled with a power source (e.g., AC power source).

In some aspects, the radio unit 604 includes an antenna unit 622, a signal unit 624, a timing unit 626, a control unit 628 and a power unit 636. The signal unit 624, timing unit 626, and control unit 628 may be internal to the antenna unit 622 or, alternatively, external to the antenna unit 622. Additionally, in some aspects (e.g., a wired configuration), the radio unit 604 further comprises one or more multiplexing devices 632 and 634, for example, frequency-domain multiplexing devices. In some aspects, multiplexing device 632 and multiplexing device 634 are a triplexer and diplexer, respectively. Alternatively, in some aspects (e.g., a wireless configuration), the radio unit 604 does not include multiplexing devices and instead includes one or more antennas (e.g., information signal antenna, auxiliary information antenna). Additionally, in other aspects, the radio unit 604 includes alternative means for transmitting information or control signals via visible (e.g., LED), invisible (e.g., IrDA) or powerline (e.g., inductive coupling) pathways, among other means. The radio unit 604 also comprises an attachment mechanism (e.g., magnetic strip or suction cup) 640 for attaching the radio unit 604 to a window or other surface. In some aspects, the baseband module 602 is coupled with a power source (e.g., AC power source).

In one aspect, the WRRH 600 (e.g., the baseband module 602 and the radio unit 604) operates within a small cell or a home gateway communication system. The radio unit 604 receives a communication signal from a base station a macro eNB 104*a*), transmits the signal through a lossy medium 605 to the baseband module 602, and the baseband module 602 redistributes the signal inside a structure (e.g., a home or any enclosed environment or non-enclosed environment that is obstructed by a lossy medium) other mobile devices 102 within the structure. Likewise, the baseband module 602 receives a communication signal from mobile devices 102, transmits the signal through the lossy medium 605 to the radio unit 604, and the radio unit 604 transmits the received signal to a base station (e.g., a macro eNB 104*a*). Thus, the WRRH 600 operates in a bi-directional manner, wherein communication or information signals between the baseband module 602 and the radio unit 604 are propagated in at least two directions, from the baseband module 602 to the radio unit 604 and from the radio unit 604 to the baseband module 602.

The modem unit 606 (e.g., WiGig, mmWave 5G modem) is coupled, through a wire or wirelessly, with one or more devices or UE. For example, a device or UE can include a mobile device, wireless router (e.g., Wi-Fi router, WiGig router), Ethernet-enabled component, a cellular booster or small cell device, among other devices or UE. In some aspects, the modem unit 606 can include processing circuitry, which may comprise one or more processors (e.g., a CPU) or, alternatively, a CPU can be external to the modem unit 606 or external to the baseband module 602 altogether. The modem unit 606, a CPU, or alternatively, the modem unit 606 coupled with a CPU, can be configured to provide computational resources to the WRRH 600, for example, managing incoming and outgoing data from the WRRH 600, local small cell or hotspot device communications, and Internet protocols.

In some aspects, because the baseband module 602 and the radio unit 604 each include multiple components, the baseband module 602 and the radio unit 604 are configured to pair to one another (e.g., mutual registration of information) and transfer data, power and control information. Pairing between the baseband module 602 and the radio unit 604 is accomplished through a pairing protocol, for example, via Bluetooth or other pairing protocols.

In some aspects, the modem unit 606, a CPU, or alternatively, the modem unit 606 coupled with a CPU, are also capable of being utilized to enable pairing (e.g., mutual registration of information) between the baseband module 602 and the radio unit 604. In some aspects, the modem unit 606 receives information signals front a CPU. For example, signal inputs to the modem unit 606 from a CPU may include any communication or information signal from a device or UE that is intended to be transmitted outside a structure that the small cell or home gateway communication system is operating within. Alternatively, the modem unit 606 can receive information signals directly from a device or UE. Likewise, signals transmitted from the modem unit 606 (e.g., to a CPU, a device or UE) may include any communication or information signal received from the radio unit 604 that is intended to be transmitted, wirelessly or wired. For example, the modem unit 606 may transmit information signals, received from the radio unit 604, to a device or UE inside a structure that the small cell or home gateway communication system is operating within.

The modem unit 606 is capable of modulation, demodulation, up-conversion and down-conversion of an information signal. Therefore, the modem unit 606 is able to receive an information signal (e.g., from a CPU, a device or UE, or the radio unit 604), modulate or demodulate the information signal, up-convert or down-convert the information signal and output an IF signal (e.g., any intermediate frequency that is capable of penetrating a given lossy medium), a baseband signal (e.g., analog or digital baseband signal), or a signal of other frequencies.

The baseband module 602 also includes a power unit 614. The power unit 614 is configured to provide power to certain components within the WRRH 600. In some aspects, the power unit 614 provides power from the baseband module 602 to the radio unit 604, and can be coupled to the modem unit 606. In some aspects, the baseband module 602 is powered by a source (e.g., AC power source) and operates as an active component by controlling the amount of power that is delivered to the radio unit 604.

In some aspects, the radio unit 604 operates as a passive component that receives power from the baseband module 602 through the power unit 614. In some aspects, in order for the baseband module 602 to distribute power to the radio unit 604 wirelessly, the power unit 614 can include a wireless power charger (e.g., induction coil) (not shown) that implements inductive coupling between the baseband module 602 and the radio unit 604. In alternative aspects, the power unit 614 delivers power to the radio unit through a wire (e.g., coaxial cable), or the radio unit 604 independently produces or receives power locally and does not rely on the baseband module 602 for power.

In some aspects, the power unit 614 also includes components (e.g., voltage regulator) to regulate the amount of power that is distributed within the baseband module 602 and to the radio unit 604, and it is also capable of transmitting certain control signals from the baseband module 602 to the radio unit 604.

In some aspects, the modem unit 606 comprises a control unit 612, which can provide control signals (e.g., 3 bit information) to certain components within the WRRH 600. In some aspects, the control unit 612 can provide control signals to the radio unit 604 and can be coupled with the modem unit 606. By transmitting control signals, the control unit 612 is capable of managing a communication session between the baseband module 602 and the radio unit 604 (e.g., initiating communication, ending communication) and controlling the antenna unit 622.

In some aspects, the control unit 612 transmits one or more control signals that cause the antenna unit 622 (e.g., causes elements of a phased array antenna) to perform certain actions (e.g., turn on/off, transmit, receive, beamforming, in a particular direction, adjust gain, adjust channelization). In some aspects, the control unit 612 outputs control signals that may be transmitted wirelessly "in-band," or within the same channel or frequency as information signals (e.g., analog IF signal, analog baseband signal) that are transmitted from the output of the modem unit 606. In some alternate aspects, the control unit 612 outputs control signals wirelessly "out-of-band," or within a channel or frequency separate from the channel or frequency of the information signal.

In some aspects, an "in-band" configuration includes a wire or transmission cable (e.g., coaxial cable) that transmits both control signals (e.g., reference clock signals) and information signals. Alternatively, an "out-of-band" configuration includes transmitting control signals on a separate path from the information signals. In some aspects, an "out-of-band" configuration includes a medium (e.g., laser, LED, IrDA) that transmits control signals separate from the medium that transmits information signals.

In some aspects, the control unit 612 outputs control signals that can be wirelessly transmitted via antenna, for example, through an auxiliary information antenna or, alternatively, through an information signal antenna, Additionally, the control unit 612 outputs control signals that can be transmitted via laser or through a wire (e.g., coaxial cable). Additionally, it is contemplated that certain control signals may also be transmitted by devices utilizing visible (e.g., LED), invisible (e.g., IrDA) or powerline (e.g., inductive coupling) pathways.

In some aspects, the modem unit 606 includes a timing unit 610 (e.g., reference clock generator), which provides a reference timing for synchronization of the system components of the WRRH 600, such as the baseband module 602 and the radio unit 604. In some aspects, the timing unit 610 is coupled with the modem unit 606, or alternatively, included within the modem unit 606. In some aspects, the timing unit 610 outputs a reference clock signal and transmits the reference clock to the radio unit 604 so that the radio unit 604 operates from the reference clock. In some aspects, the reference clock is transmitted through a wire (e.g., coaxial cable) or is transmitted wirelessly (e.g., through the auxiliary information antenna) between the baseband module 602 and the radio unit 604. Alternatively, the reference clock signal is locally generated at both the baseband module 602 and the radio unit 604.

In some aspects, the timing unit 610 transmits the reference clock signals "in-band," or within the same channel or frequency as information signals (e.g., analog IF signal, analog baseband signal) that are transmitted from the output of the modem unit 606. Alternatively, the timing unit 610 transmits the reference clock signals "out-of-band," or within a channel or frequency separate from the channel or frequency of the information signal.

In some aspects, the timing unit 610 outputs reference clock signals that are wirelessly transmitted via antenna means. Alternatively, the timing unit 610 can transmit reference clock signals via laser or through a wired coupling (e.g., coaxial cable). Additionally, it is contemplated that certain reference clock signals may also be transmitted by devices utilizing visible (e.g., LED), invisible (e.g., IrDA) or powerline (e.g., inductive coupling) pathways, among other means.

In some aspects, the modern unit 606 comprises a signal unit 608, which provides an information signal output from the modem unit 606. In some aspects, the signal unit 608 is coupled with the modem unit 606, or alternatively, included within the modern unit 606. As previously discussed, the modem unit 606 can be configured to transmit and receive an information signal (e.g., to or from a CPU, a device or UE), modulate or demodulate an information signal, up-convert or down-convert an information signal, and output an IF signal, baseband signal (e.g., analog or digital baseband signal) or other frequency signals.

In some aspects, alternatively to transmitting an information signal via wired coupling between the baseband module 602 and the radio unit 604 (e.g., coaxial cable), the signal unit 608 can be configured to output an information signal that is transmitted wirelessly from the baseband module 602 to the radio unit 604. The signal unit 608 may comprise means to wirelessly transmit an information signal, for example, an information signal antenna (e.g., a waveguide and horn antenna, a single patch antenna, or a multi-patch array antenna). The wireless transmission means can be included within the signal unit 608 or, alternatively, can be external to the signal unit 608. Additionally, it is contemplated that certain information signals (e.g., IF signals, baseband signals) may also be transmitted by devices utilizing visible (e.g., invisible (e.g., IrDA) or powerline (e.g., inductive coupling) pathways, among other means.

In some aspects, alternatively to transmitting control and reference clock signals from the timing unit 610 and a control unit 612 via wired coupling between the baseband module 602 and the radio unit 604 (e.g., coaxial cable), the modem unit 606 (e.g., signal unit 608, timing unit 610, control unit 612) can be configured to output control and reference clock signals that can be transmitted wirelessly from the baseband module 602 to the radio unit 604.

The timing unit 610, control unit 612, or the signal unit 608, may comprise means to wirelessly transmit control and reference clock signals, for example, through an auxiliary information antenna (e.g., a waveguide and horn antenna, a single patch antenna, or a multi-patch array antenna). The wireless transmission means can be included within the modem unit 606 (e.g., signal unit 608, timing unit 610, control unit 612) or, alternatively, can be external to the modem unit 606. Additionally, it is contemplated that certain information signals (e.g., IF signals, baseband signals) may also be transmitted by devices utilizing visible (e.g., LED), invisible (e.g., IrDA) or powerline (e.g., inductive coupling) pathways, among other means. In some aspects, IF signals, analog baseband signals or other frequency signals can be transmitted with the control signal and reference clock signal together over the same transmission path (e.g., using the same antenna or the same hardwired transmission path).

In some aspects, the baseband module 602 includes an attachment mechanism 638 for attaching the baseband module 602 to the lossy medium 605. In some aspects, where the lossy medium 605 is a window, the attachment mechanism 638 can include a magnetic element (e.g., magnetic strip) that attaches to the window by way of the adjacent alignment of the attachment mechanism 640 of the radio unit 604 on the opposite side of the window. Where the attachment mechanism 638 of the baseband module 602 and the attachment mechanism 640 of the radio unit 604 include a magnetic element, such qualities cause the baseband module 602 and the radio unit 604 to be capable of maintaining alignment during attachment to the window, as the magnetic field transmits through the lossy medium. Alternatively, the attachment mechanism 638 of the baseband module 602 and the attachment mechanism 640 of the radio unit 604 may be implemented by other attachment means, for example, by a suction mechanism (e.g., suction cup) or by pins.

In some aspects, the antenna unit 622 of the radio unit 604 includes an antenna array (e.g., phased array antenna) and is coupled with a power unit 636. In some aspects, the antenna unit 622 comprises a control unit 628, a timing unit 626 and a signal unit 624. Alternatively, the control unit 628, timing unit 626 and signal unit 624 can be external to the antenna unit 622. The antenna unit 622 can be configured to perform up-conversion and down-conversion of an information signal, and may be configured to perform such actions on both a received signal from outside of a structure or home (e.g., a received wireless RF signal) and a received signal from the baseband module 602, for example, an IF signal. Therefore, between the antenna unit 622 of the radio unit 604 and the modem unit 606 of the baseband module 602, the WRRH 600 performs the two-stage up-conversion or two-stage down-conversion of information signals.

In some aspects, the radio unit 604 includes a power unit 636, which provides power to components within the radio unit 604, for example the antenna unit 622. In some aspects, the power unit 636 is coupled with the antenna unit 622 and provides power from the baseband module 602, through wireless inductive coupling, to the antenna unit 622. The power unit 636 can also be included within the antenna unit 622. Alternatively, the power unit 636 provides local power to the radio unit 604 (e.g., antenna unit 622) without wireless inductive coupling to the baseband module 602, or provides power to the radio unit 604 through a wire with the baseband module 602 (e.g., coaxial cable). In some aspects, the power unit 636 also includes components (e.g., voltage regulator) to regulate the amount of power that is distributed within the radio unit 604 and to the antenna unit 622.

In some aspects, the power unit 636 can be configured to transmit certain control signals to the antenna unit 622, for example, control signals received from the baseband module 602 through the coupling of the power unit 614 of the baseband module 602 with the power unit 636 of the radio unit 604. Control signals from the power unit 636 are capable of programming the antenna unit 622 (e.g., programming the elements of the phased array antenna), for example, by providing on/off, transmit, receive and beamforming commands, and adjusting gain and channelization.

In some aspects, the radio unit 604 includes a control unit 628 that provides control signals (e.g., 3 bit information) to certain components within the radio unit 604. In some aspects, the control unit 628 is coupled with, or included within, the antenna unit 622 and provides control signals to the antenna unit 622. The control unit 628 transmits control signals received from the baseband module 602 that cause the antenna unit 622 (e.g., cause elements of a phased array antenna) to perform certain actions (e.g., turn on/off, transmit, receive, beamforming in a particular direction, adjust gain, adjust channelization).

In some aspects, the radio unit 604 also includes a timing unit 626 (e.g., reference clock generator) that provides a reference timing for synchronization of the communications transmitted from the radio unit 604 to the baseband module 602, as well as for synchronization of the components of the radio unit 604. In some aspects, the timing unit 626 is coupled with, or included within, the antenna unit 622 and provides a reference clock signals to the antenna unit 622. The timing unit 626 outputs a reference clock signal that is transmitted, wired or wirelessly, between the radio unit 604 and the baseband module 602. Alternatively, the reference clock signal is locally generated.

In some aspects, the timing unit 626 is configured to transmit reference clock signals "in-band," or within the same channel or frequency as information signals (e.g., analog IF signal, analog baseband signal) that are transmitted from the output of the antenna unit 622. Alternatively, the timing unit 626 is configured to transmit reference clock signals "out-of-band," or within a channel or frequency separate from the channel or frequency of the information signal.

In some aspects, the timing unit 626 configured to outputs reference clock signals that may be wirelessly transmitted via antenna means (e.g., a waveguide and horn antenna, a single patch antenna, or a multi-patch array antenna). The antenna means may be included within the antenna unit 622 or external to the antenna unit 622. Alternatively, the timing unit 626 may be configured to transmit reference clock signals via laser or through a wire (e.g., coaxial cable). Additionally, it is contemplated that the timing unit 626 may be configured to transmit certain reference clock signals through visible (e.g., LED), invisible (e.g., IrDA) or powerline (e.g., inductive coupling) pathways, among other means.

In some aspects, the signal unit 624 may be configured to output an information signal that can be transmitted wirelessly from the radio unit 604 to the baseband module 602. The signal unit 624 may comprise means to wirelessly transmit an information signal, for example, an information signal antenna (e.g., a waveguide and horn antenna, a single patch antenna, or a multi-patch array antenna). The wireless transmission means can be included within the signal unit 624 or, alternatively, can be external to the signal unit 624. Additionally, it is contemplated that certain information signals (e.g., IF signals, baseband signals) may also be transmitted by devices utilizing visible (e.g., LED), invisible (e.g., IrDA) or powerline (e.g., inductive coupling) pathways, among other means.

In some aspects, the antenna unit 622 (e.g., signal unit 624, timing unit 626, control unit 628) may be configured to output control and reference clock signals that can be transmitted wirelessly from the radio unit 604 to the baseband module 602. The timing unit 626, control unit 628, or the signal unit 624, may comprise means to wirelessly transmit control and reference clock signals, for example, through an auxiliary information antenna (e.g., a waveguide and horn antenna, a single patch antenna, or a multi-patch array antenna). The wireless transmission means can be included within the antenna unit 622 (e.g., signal unit 624, timing unit 626, control unit 628) or, alternatively, can be external to the antenna unit 622. Additionally, it is contemplated that certain information signals (e.g., IF signals, baseband signals) may also be transmitted by devices utilizing visible (e.g., invisible (e.g., IrDA) or powerline (e.g., inductive coupling) pathways, among other means. In some aspects, IF signals, analog baseband signals, or other frequency signals can be transmitted with a control signal and reference clock signal together over the same transmission path (e.g., using the same antenna or the same hardwired transmission path).

In some aspects, the radio unit 604 includes a controller 642. The controller 642 is a control unit within the radio unit 604 that includes, for example, a microcontroller or a Field Programmable Gate Array (FPGA) that is configured to control the components of the radio unit 604. In some aspects, the controller 642 controls the power of the radio unit 604 and the antenna unit 622 (e.g., training the antenna patterns, transmit power, and receive power of the antenna).

In some aspects, for communication between the baseband module 602 and radio unit 604 to be coordinated, the baseband module 602 and radio unit 604 are paired together. In some aspects, the controller 642 is configured to control the pairing between the baseband module 602 and the radio unit 604 in order to coordinate communication. For example, the controller 642 can be configured to perform the mutual registration of information associated with the two units, and enable communication.

In some aspects, the modem unit 606, a CPU, or alternatively, the modem unit 606 coupled with a CPU, associated with the baseband module 602, and the controller 642 operate to pair the baseband module 602 with the radio unit 604, including pairing of power between the baseband module 602 and radio unit 604, pairing of information and control signals, and pairing of the clock signal, among other aspects.

In some aspects, the radio unit 604 includes an attachment mechanism 640 for attaching the radio unit 604 to the lossy medium 605. In some aspects, where the lossy medium 605 is a window, the attachment mechanism 640 includes a magnetic element (e.g., magnetic strip) and attaches to the window by way of the adjacent alignment of the attachment mechanism 638 of the baseband module 602 on the opposite side of the window. Where the attachment mechanism 640 of the radio unit 604 and the attachment mechanism 638 of the baseband module 602 include a magnetic element, the baseband module 602 and the radio unit 604 maintain alignment during attachment to the window. Alternatively, the attachment mechanism 640 of the radio unit 604 and the attachment mechanism 638 of the baseband module 602 may be implemented by other attachment means, for example, by a suction mechanism (e.g., suction cup) or by pins, among other attachment means.

EXAMPLES

Although an aspect has been described with reference to specific example aspects, it will be evident that various modifications and changes may be made to these aspects without departing from the broader spirit and scope of the present disclosure. Accordingly, the specification and drawings are to be regarded in an illustrative rather than a restrictive sense. The accompanying drawings that form a part thereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, by the term "aspect" merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects, and other aspects not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is submitted with the understanding that it will not be used to interpret or limit the scope or meaning of the claims. In addition, in the foregoing Detailed Description, it can be seen that various features are grouped together in a single aspect for the purpose of streamlining the disclosure. This method of disclosure is not to be interpreted as reflecting an intention that the claimed aspects require more features than are expressly recited in each claim. Rather, as the following claims reflect, inventive subject matter lies in less than all features of a single disclosed aspect. Thus the following claims are hereby incorporated into the Detailed Description, with each claim standing on its own as a separate aspect.

The following describes various examples of methods, machine-readable media, and systems (e.g., machines, devices, or other apparatus) discussed herein.

Example 1 is a remote radio head (RRH) comprising: a baseband module; and a radio frequency (RF) unit, wherein the RF unit comprises circuitry configured to: convert non-millimeter-wave frequency signals received from the baseband module through a lossy medium to millimeter-wave (mmW) signals for transmission, and convert mmW signals received from a wireless communication cell to non-mmW signals for transmission to the baseband module through the lossy medium.

In Example 2, the subject matter of Example 1 includes, the baseband module and the RF unit being configured to be placed on opposing sides of the lossy medium, and wherein the baseband module comprises circuitry configured to: convert the non-mmW signals received from the RF unit through the lossy medium to analog high frequency signals for communication with a mobile communication device; and convert RF signals received from the mobile communication device to non-mmW signals for transmission to the RF unit.

In Example 3, the subject matter of Example 2 includes, wherein the non-mmW signals comprise intermediate frequency (IF) signals, and the circuitry of the RF unit is further configured to convert mmW signals received from a wireless communication cell to IF signals for transmission to the baseband module through the lossy medium and convert IF signals received from the baseband module through the lossy medium to mmW signals for transmission, and the circuitry of the baseband module is further configured to convert the IF signals received from the RF unit through the lossy medium to analog high frequency signals for communication with a mobile communication device and convert RF signals received from the mobile communication device to IF signals for transmission to the RF unit.

In Example 4, the subject matter of Examples 2-3 includes, wherein the non-mmW signals comprise baseband (BB) signals, and the circuitry of the RF unit is further configured to convert BB signals received from the baseband module through the lossy medium to mmW signals for transmission to a wireless communication cell and convert mmW signals received from the wireless communication cell to BB signals for transmission to the baseband module through the lossy medium, and the circuitry of the baseband module is further configured to convert the BB signals received from the RF unit through the lossy medium to RF signals for communication with UE and convert RF signals received from UE to BB signals for transmission to the RF unit.

In Example 5, the subject matter of Examples 2-4 includes, wherein the circuitry of the baseband module is further configured to: convert the non-mmW signals received from the RF unit through the lossy medium to mmW signals for communication with UE; and convert mmW signals received from UE to non-mmW signals for transmission to the RF unit.

In Example 6, the subject matter of Examples 2-5 includes, wherein the circuitry of the baseband module is further configured to: convert the non-mmW signals received from the RF unit through the lossy medium to digital BB signals for communication with UE; and convert digital BB signals received from UE to non-mmW signals for transmission to the RF unit.

In Example 7, the subject matter of Examples 2-6 includes, wherein the circuitry of the RF unit is further configured to: convert the non-mmW signals received from the baseball module through the lossy medium to mmW signals for communication with UE; and convert mmW signals received from UE to non-mmW signals for transmission to the baseband module.

In Example 8, the subject matter of Examples 2-7 includes, wherein the circuitry of the RF unit is further configured to: convert the non-mmW signals received from the baseband module through the lossy medium to RF signals for communication with UE, and convert RF signals received from UE to non-mmW signals for transmission to the baseband module.

In Example 9, the subject matter of Examples 2-8 includes, wherein the circuitry of the RF unit is further configured to: convert the non-mmW signals received from the baseband module through the lossy medium to RF signals for transmission to a base station; and convert RF signals received from the base station to non-mmW signals for transmission to the baseband module.

In Example 10, the subject matter of Examples 2-9 includes, wherein the baseband module and the RF unit each comprise one or more antennas configured to communicate non-mmW signals through the lossy medium between the baseband module and the RF unit.

In Example 11, the subject matter of Examples 2-10 includes, wherein the circuitry of the RF unit and the circuitry of the baseband module are further configured to receive and communicate non-mmW signals through the lossy medium via LED, laser, IrDA, or inductive coupling.

In Example 12, the subject matter of Examples 2-11 includes, wherein the baseband module powers the RF unit by providing wireless power transfer to the RF unit through inductive coupling.

In Example 13, the subject matter of Examples 2-12 includes, wherein the baseband module and the RF unit each include an attachment mechanism configured to align the baseband module in a first side of the lossy medium with the RF unit on a second side of the lossy medium.

In Example 14, the subject matter of Example 13 includes, wherein the attachment mechanism is further configured to align one or more antennas in the baseband module with one or more antennas in the RF unit.

In Example 15, the subject matter of Example 14 includes, wherein the attachment mechanism comprises a magnetic attachment mechanism.

In Example 16, the subject matter of Examples 2-15 includes, wherein the RF unit and the baseband module further comprise circuitry configured to enable pairing between the RF unit and the baseband module.

Example 17 is an apparatus of a radio frequency (RF) unit, the apparatus comprising: processing circuitry and memory, and configured to: pair with a baseband module by implementing a pairing protocol, the RF unit configurable to be disposed on an opposing side of a lossy medium from the baseband module; convert non-millimeter-wave frequency signals received from the baseband module through the lossy medium to millimeter-wave (mmW) signals for transmission, and convert mmW signals received from a wireless communication cell to non-mmW signals for transmission to the baseband module through the lossy medium.

In Example 18, the subject matter of Example 17 includes, wherein the non-mmW signals comprise intermediate frequency (IF) signals, and the apparatus is configured to convert mmW signals received from a wireless communication cell to IF signals for transmission to the baseband module through the lossy medium and convert IF signals received from the baseband module through the lossy medium to mmW signals for transmission.

In Example 19, the subject matter of Examples 17-18 includes, wherein the non-mmW signals comprise baseband (BB) signals, and the apparatus is configured to convert BB signals received from the baseband module through the lossy medium to mmW signals for transmission to a wireless communication cell and convert mmW signals received from the wireless communication cell to BB signals for transmission to the baseband module through the lossy medium.

In Example 20, the subject matter of Examples 17-19 includes, configured to: convert the non-mmW signals received from the baseband module through the lossy medium to mmW signals for communication with UE; and convert mmW signals received from UE to non-mmW signals for transmission to the baseband module.

In Example 21, the subject matter of Examples 17-20 includes, configured to: convert the non-mmW signals received from the baseband module through the lossy medium to RF signals for communication with UE; and convert RF signals received from UE to non-mmW signals for transmission to the baseband module.

In Example 22, the subject matter of Examples 17-21 includes, configured to: convert the non-mmW signals received from the baseband module through the lossy medium to RF signals for transmission to a base station; and convert RF signals received from the base station to non-mmW signals for transmission to the baseband module.

Example 23 is a computer-readable storage medium that stores instructions for execution by one or more processors of a baseband module to communicate with user equipment (UE), the one or more processors to configure the baseband module to: pair with a radio frequency (RF) unit by implementing a pairing protocol, the baseband module configurable to be located on an opposing side of a lossy medium from the RF unit; convert the non-mmW signals received from the RF unit through the lossy medium to analog high frequency signals for communication with a mobile communication device; and convert RF signals received from the mobile communication device to non-mmW signals for transmission to the RF unit through the lossy medium.

In Example 24, the subject matter of Example 23 includes, wherein the non-mmW signals comprise intermediate frequency (IF) signals, and the one or more processors further configure the baseband module to: convert IF signals received from the RF unit through the lossy medium to analog high frequency signals for communication with a mobile communication device and convert RF signals received from the mobile communication device to IF signals for transmission to the RF unit through the lossy medium.

In Example 25, the subject matter of Examples 23-24 includes, wherein the non-mmW signals comprise baseband (BB) signals, and the one or more processors further configure the baseband module to: convert BB signals received from the RF unit through the lossy medium to RF signals for communication with UE and convert RF signals received from UE to BB signals for transmission to the RF unit through the lossy medium.

Example 26 is at least one machine-readable medium including instructions that, when executed by processing circuitry, cause the processing circuitry to perform operations to implement of any of Examples 1-25.

Example 27 is an apparatus comprising means to implement of any of Examples 1-25.

Example 28 is a system to implement of any of Examples 1-25. Example 29 is a method to implement of any of Examples 1-25.

What is claimed is:
1. A remote radio head (RRH) comprising:
a baseband module and a radio frequency (RF) unit configured to be placed on opposing sides of a lossy medium,
wherein the RF unit comprises circuitry configured to:
convert non-millimeter-wave (non-mmW) frequency signals received from the baseband module through the lossy medium to millimeter-wave (mmW) signals for transmission, and
convert mmW signals received from a wireless communication cell to non-mmW signals for transmission to the baseband module through the lossy medium; and
wherein the baseband module comprises circuitry configured to:
convert the non-mmW signals received from the RF unit through the lossy medium to analog high frequency signals for communication with a mobile communication device; and convert RF signals received from the mobile communication device to non-mmW signals for transmission to the RF unit;
wherein the non-mmW signals comprise one of:
intermediate frequency (IF) signals; or
baseband (BB) signals.

2. The RRH of claim 1, wherein the circuitry of the baseband module is further configured to:
convert the non-mmW signals received from the RF unit through the lossy medium to mmW signals for communication with a UE; and
convert mmW signals received from the UE to non-mmW signals for transmission to the RF unit.

3. The RRH of claim 1, wherein the circuitry of the baseband module is further configured to:
convert the non-mmW signals received from the RF unit through the lossy medium to digital BB signals for communication with a UE; and
convert digital BB signals received from the UE to non-mmW signals for transmission to the RF unit.

4. The RRH of claim 1, wherein the circuitry of the RF unit is further configured to:
convert the non-mmW signals received from the baseband module through the lossy medium to mmW signals for communication with a UE; and
convert mmW signals received from the UE to non-mmW signals for transmission to the baseband module.

5. The RRH of claim 1, wherein the circuitry of the RF unit is further configured to:
convert the non-mmW signals received from the baseband module through the lossy medium to RF signals for communication with a UE; and
convert RF signals received from the UE to non-mmW signals for transmission to the baseband module.

6. The RRH of claim 1, wherein the circuitry of the RF unit is further configured to:
convert the non-mmW signals received from the baseband module through the lossy medium to RF signals for transmission to a base station; and
convert RF signals received from the base station to non-mmW signals for transmission to the baseband module.

7. The RRH of claim 1, wherein the baseband module and the RF unit each comprise one or more antennas configured to communicate non-mmW signals through the lossy medium between the baseband module and the RF unit.

8. The RRH of claim 1, wherein the circuitry of the RF unit and the circuitry of the baseband module are further configured to receive and communicate non-mmW signals through the lossy medium via Light Emitting Diode (LED), laser, Infrared Data Association (IrDA), or inductive coupling.

9. The RRH of claim 1, wherein the baseband module powers the RF unit by providing wireless power transfer to the RF unit through inductive coupling.

10. The RRH of claim 1, wherein the baseband module and the RF unit each include an attachment mechanism configured to align the baseband module in a first side of the lossy medium with the RF unit on a second side of the lossy medium.

11. The RRH of claim 10, wherein the attachment mechanism is further configured to align one or more antennas in the baseband module with one or more antennas in the RF unit.

12. The RRH of claim 11, wherein the attachment mechanism comprises a magnetic attachment mechanism.

13. The RRH of claim 1, wherein the RF unit and the baseband module further comprise circuitry configured to enable pairing between the RF unit and the baseband module.

14. An apparatus of a radio frequency (RF) unit, the apparatus comprising:
processing circuitry and memory, and configured to:
pair with a baseband module by implementing a pairing protocol, the RF unit configurable to be disposed on an opposing side of a lossy medium from the baseband module;
convert non-millimeter-wave frequency signals received from the baseband module through the lossy medium to millimeter-wave (mmW) signals for transmission, and
convert mmW signals received from a wireless communication cell to non-mmW signals for transmission to the baseband module through the lossy medium; and
convert mm W signals received from the wireless communication cell to intermediate frequency (IF) signals for transmission to the baseband module through the lossy medium and convert IF signals received from the baseband module through the lossy medium to mm W signals for transmission, when the non-mmW signals comprise IF signals.

15. The apparatus of claim 14, wherein the non-mmW signals comprise baseband (BB) signals, and
the apparatus is configured to convert BB signals received from the baseband module through the lossy medium to mmW signals for transmission to a wireless communication cell and convert mmW signals received from the wireless communication cell to BB signals for transmission to the baseband module through the lossy medium.

16. The apparatus of claim 14, further configured to:
convert the non-mmW signals received from the baseband module through the lossy medium to mmW signals for communication with a UE and/or a base station; and
convert mmW signals received from the UE and/or the base station to non-mmW signals for transmission to the baseband module.

17. A non-transitory computer-readable storage medium that stores instructions executable by one or more processors of a baseband module to communicate with a user equipment (UE) and configure the baseband module to:
pair with a radio frequency (RF) unit by implementing a pairing protocol, the baseband module configurable to be located on an opposing side of a lossy medium from the RF unit;
convert the non-mmW signals received from the RF unit through the lossy medium to analog high frequency signals for communication with a mobile communication device; and
convert RF signals received from the mobile communication device to non-mmW signals for transmission to the RF unit through the lossy medium; and
convert intermediate frequency (IF) signals received from the RF unit through the lossy medium to analog high frequency signals for communication with the mobile communication device and convert RF signals received from the mobile communication device to IF signals for transmission to the RF unit through the lossy medium, when the non-mmW signals comprise IF signals.

18. The non-transitory memory element of claim 17, wherein the non-mmW signals comprise baseband (BB) signals, and wherein the instructions are executable by the one or more processors to further configure the baseband module to:

convert BB signals received from the RF unit through the lossy medium to RF signals for communication with the UE, and convert RF signals received from the UE to BB signals for transmission to the RF unit.

19. The non-transitory memory element of claim 17, wherein the instructions are executable by the one or more processors to further configure the baseband module to power the RF unit by providing wireless power transfer to the RF unit through inductive coupling.

20. The non-transitory memory element of claim 17, wherein the instructions are executable by the one or more processors to further configure the baseband module to receive and communicate the non-mmW signals through the lossy medium via Light Emitting Diode (LED), laser, Infrared Data Association (IrDA), or inductive coupling.

* * * * *